United States Patent
Lee et al.

(10) Patent No.: US 11,543,871 B2
(45) Date of Patent: Jan. 3, 2023

(54) STORAGE DEVICE, MULTI-COMPONENT DEVICE AND METHOD OF CONTROLLING OPERATION OF THE SAME

(71) Applicant: SAMSUNG ELECTRONICS CO., LTD., Suwon-si (KR)

(72) Inventors: Yongin Lee, Suwon-si (KR); Hyuk Lee, Seongnam-si (KR); Seunghyun Choi, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/239,654

(22) Filed: Apr. 25, 2021

(65) Prior Publication Data

US 2022/0129056 A1 Apr. 28, 2022

(30) Foreign Application Priority Data

Oct. 22, 2020 (KR) ........................ 10-2020-0137317

(51) Int. Cl.
*G06F 1/3206* (2019.01)
*G06F 1/28* (2006.01)

(52) U.S. Cl.
CPC .............. *G06F 1/3206* (2013.01); *G06F 1/28* (2013.01)

(58) Field of Classification Search
CPC .................................. G06F 1/3206; G06F 1/28
See application file for complete search history.

(56) References Cited

U.S. PATENT DOCUMENTS

| | | |
|---|---|---|
| 6,489,793 B2 | 12/2002 | Jones et al. |
| 7,007,176 B2 | 2/2006 | Goodfellow et al. |
| 7,104,987 B2 | 9/2006 | Biggs et al. |
| 8,645,733 B2 | 2/2014 | Kansal et al. |
| 9,058,155 B2 | 6/2015 | Cepulis et al. |
| 9,063,732 B2 | 6/2015 | Byom et al. |
| 9,760,311 B1 | 9/2017 | Amir et al. |
| 9,946,481 B2 | 4/2018 | Warriner |

(Continued)

FOREIGN PATENT DOCUMENTS

| | | |
|---|---|---|
| KR | 20170033227 A | 3/2017 |
| KR | 1725691 B1 | 4/2017 |

OTHER PUBLICATIONS

European Search Report dated Jan. 21, 2022 Cited From European Patent Application No. 21175841.1.

*Primary Examiner* — Gary Collins
(74) *Attorney, Agent, or Firm* — Volentine, Whitt & Francos, PLLC

(57) ABSTRACT

A storage device includes a solid state drive (SSD), a field programmable gate array (FPGA), a power sensor and a global controller. The SSD stores data and receives power through a power rail connected to a host device. The FPGA processes data read from the SSD or data to be stored in the SSD and receives power through the power rail. The power sensor is connected to the power rail and generates a measured power value corresponding to a total power consumed by the SSD and the FPGA by measuring the total power. The global controller determines one of the SSD and the FPGA as a priority component operating with a fixed performance and determines the other of the SSD and the FPGA as a non-priority component operating with a variable performance in a priority mode based on power control information provided from the host device.

20 Claims, 28 Drawing Sheets

(56) References Cited

U.S. PATENT DOCUMENTS

| | | |
|---|---|---|
| 10,120,426 B2 | 11/2018 | Seo et al. |
| 10,241,701 B2 | 3/2019 | Choi et al. |
| 2007/0211551 A1* | 9/2007 | Yogev ................. G11C 5/14 365/226 |
| 2016/0085290 A1* | 3/2016 | Skandakumaran ..... G06F 1/329 713/320 |
| 2016/0320995 A1* | 11/2016 | Warriner ............... G06F 1/206 |
| 2017/0300263 A1* | 10/2017 | Helmick ............... G06F 3/0679 |
| 2019/0179685 A1 | 6/2019 | Ki |
| 2019/0235791 A1 | 8/2019 | Chun et al. |
| 2019/0272021 A1* | 9/2019 | Olarig ................. G06F 1/3275 |
| 2020/0409441 A1* | 12/2020 | Hatch ................. G06F 1/3268 |

* cited by examiner

STORAGE DEVICE, MULTI-COMPONENT DEVICE AND METHOD OF CONTROLLING OPERATION OF THE SAME

CROSS-REFERENCE TO RELATED APPLICATION

This U.S. non-provisional application claims priority under 35 USC § 119 to Korean Patent Application No. 10-2020-0137317, filed on Oct. 22, 2020, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a storage device, a multi-component device and a method of controlling an operation of a multi-component device.

2. Discussion of the Related Art

In a multi-component device including a plurality of components, it is required to maximize performance of the plurality of components within a limited power budget. For example, a 2.5-inch storage form factor has a power limit of 25 W (watt) but power consumption of a storage device may easily exceed the power limit in a circumstance in which components, such as a field programmable gate array (FPGA) configured to perform an additional function, are integrated in the storage device. In such multi-component device, both heating and power consumption have to be considered and a mechanism for performance balance between the components is required to maintain the limited power budget. In particular, when an FPGA and a solid state drive (SSD) integrated in the storage device operate independently, exact relationships between workloads and powers of the FPGA and the SSD are required for implementing the performance balance. Such schemes for the performance balance require a complex structure and it is not easy to obtain the exact relationships between the workloads and the powers.

Although a power throttling operation may be performed in the multi-component device by use of power sensors for respective components, an additional algorithm is required for implementing the performance balance and it is difficult to predict exact powers of the respective components.

SUMMARY

Some example embodiments may provide a storage device capable of efficiently implementing performance balance between an SSD and an FPGA included in the storage device.

Some example embodiments may provide a multi-component device and a method of controlling an operation of the multi-component device capable of efficiently implementing performance balance between a plurality of components included in the multi-component device.

According to example embodiments, a storage device includes a solid state drive (SSD), a field programmable gate array (FPGA), a power sensor and a global controller. The SSD stores data and receives power through a power rail connected to a host device. The FPGA processes data read from the SSD or data to be stored in the SSD and receive power through the power rail. The power sensor is connected to the power rail and generates a measured power value corresponding to a total power consumed by the SSD and the FPGA by measuring the total power. The global controller determines one of the SSD and the FPGA as a priority component operating with a fixed performance and determines the other of the SSD and the FPGA as a non-priority component operating with a variable performance in a priority mode based on power control information provided from the host device.

According to example embodiments, a multi-component device includes a plurality of components, a power sensor and a global controller. The plurality of components receives power through a power rail connected to a host device. The power sensor is connected to the power rail and generates a measured power value corresponding to a total power consumed by the plurality of components by measuring the total power. The global controller determines one of the plurality of components as a priority component operating with a fixed performance and determines the components other than the priority component as non-priority components operating with a variable performance in a priority mode based on power control information provided from the host device.

According to example embodiments, a method of controlling an operation of a multi-component device having a plurality of components includes providing power to the plurality of components through a power rail connected to a host device, generating a measured power value indicating a total power consumed by the plurality of components by measuring the total power using a power sensor connected to the power rail and determining at least one of the plurality of components as a priority component operating with a fixed performance and determining the components other than the priority component as non-priority components operating with a variable performance in a priority mode based on power control information provided from the host device.

The storage device, the multi-component device and the method of controlling the operation of the multi-component device according to example embodiments may efficiently implement performance balance and observe the power limit without prediction of powers of the respective components, through the priority mode in which at least one component is controlled to operate as the priority component having the fixed performance and the other components are controlled to operate as the non-priority components having the variable performance.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
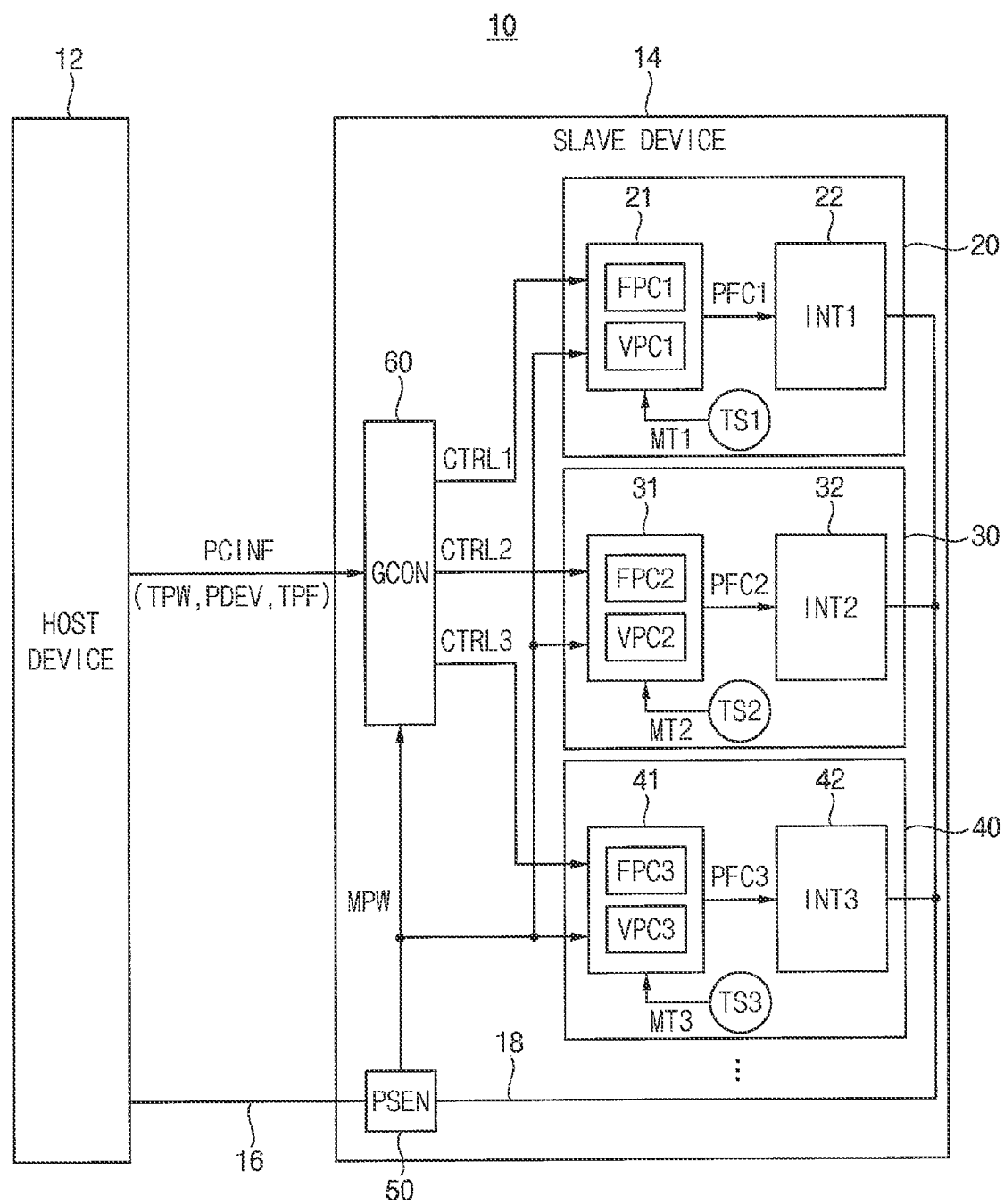
FIG. 1 is a block diagram illustrating a system including a multi-component device according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating a system including a multi-component device according to example embodiments.

Referring to FIG. 1, a system 10 includes a host device 12 and a slave device 14. The slave device 14 may be controlled by the host device 12 to provide a service corresponding to a request from the host device 12. For example, the slave device 14 may store data transferred from the host device 12 and/or process data from the host device 12 or data stored in the slave device 14, in response to the request from the host device 12.

The slave device 14 or a multi-component device 14 may include a plurality of components 20, 30 and 40, a power sensor PSEN 50 and a global controller GCON 60.

The components 20, 30 and 40 may receive power from the host device 12 through a power rail 16 connected to the host device 12. The power provided through the power rail 16 may be distributed to the components 20, 30 and 40 through internal wirings 18. FIG. 1 illustrates the three components 20, 30 and 40 for convenience of illustration and description but the multi-component device 14 may include two, four or more components. In this disclosure, "a component" indicates a unit configuration such that performance and power may be controlled individually.

The power sensor 50 is connected to the power rail 16. The power sensor 50 may generate a measured power value MPW, corresponding to a total power consumed by the plurality of components 20, 30 and 40, by measuring the total power.

The global controller 60 may determine one of the plurality of components 20, 30 and 40 as a priority component and determine the components except the priority component as non-priority components in a priority mode based on power control information PCINF provided from the host device 12. The priority component may operate with a fixed performance and the non-priority components may operate with a variable performance. As will be described below in detail, the fixed performance indicates a performance that is determined based on a target performance value TPF provided from the host device 12. In contrast, the variable performance indicates a performance that is determined based on the measured power value MPW. The target performance value TPF may be determined as a fixed value by the host device 12 regardless of the measured power value MPW. The measured power value MPW may be varied depending on the total power consumed by the plurality of components 20, 30 and 40.

Each of the components 20, 30 and 40 may include an internal circuit configured to perform its own function and a performance controller configured to control performance and power of the internal circuit. For example, the first component 20 may include a first performance controller 21 and a first internal circuit INT1 22, the second component 30 may include a second performance controller 31 and a second internal circuit INT2 32, and the third component 40 may include a third performance controller 41 and a third internal circuit INT3 42.

Each of the first, second and third performance controllers 21, 31 and 41 may include a fixed performance controller configured to provide a fixed performance control value when the corresponding component is the priority component operating with the fixed performance and a variable performance controller configured to provide a variable performance control value when the corresponding component is the non-priority component operating with the variable performance. For example, the first performance controller 21 may include a first fixed performance controller FPC1 and a first variable performance controller VPC1, the second performance controller 31 may include a second fixed performance controller FPC2 and a second variable performance controller VPC2, and the third performance controller 41 may include a third fixed performance controller FPC3 and a third variable performance controller VPC3.

The power control information PCINF provided from the host device 12 may include a target power value TPW indicating a power limit of the multi-component device 14, priority component information PDEV indicating the priority component and a target performance value TPF indicating the fixed performance of the priority component.

In some example embodiments, the power control information PCINF may be provided based on a command that is transferred from the host device 12 to the multi-component device 14. The power control information PCINF may be included in the command or may be provided through a data bus when the command is transferred through a command-address bus. In some example embodiments, the power control information PCINF may be provided through control lines distinct from the command-address bus and the data bus.

The global controller 60 may determine an operation mode of the multi-component device 14 based on the priority component information PDEV. For example, the priority component information PDEV may include at least one component identifier corresponding the at least one priority component. The global controller 60 may determine the operation mode as the priority mode when the priority component information PDEV includes at least one component identifier and determine the operation mode as the non-priority mode when the priority component information PDEV does not include any component identifier. As will be described below with reference to FIG. 7, the global controller 60 may enable the fixed performance controller and disable the variable performance controller with respect to the priority component. In contrast, the global controller 60 may enable the variable performance controller and disable the fixed performance controller with respect to the non-priority component.

The global controller 60 may generate first, second and third control signals CTRL1, CTRL2 and CTRL3 to respectively control the first, second and third components 20, 30 and 40. The control signals CTRL1, CTRL2 and CTRL3 may include the target power value TPW and the target performance value provided to the priority component and a selection signal to selectively enable the fixed performance controller or the variable performance controller in each component.

FIG. 1 illustrates that the global controller 60 is disposed in the multi-component device 14 and the global controller 60 is distinct from the components 20, 30 and 40, but example embodiments are not limited thereto. In some example embodiments, the global controller 60 may be included in one of the components 20, 30 and 40, or the global controller 60 may be disposed in the host device 12.

Each of the performance controllers 21, 31 and 41 may provide the performance control value to control performance and power of the corresponding internal circuit based on the control signals CTRL1, CTRL2 and CTRL3 and the measured power value MPW. The first performance controller 21 may provide a first performance control value PFC1 to the first internal circuit 22 based on the first control signal CTRL1 and the measured power value MPW, the second performance controller 31 may provide a second performance control value PFC2 to the second internal circuit 32 based on the second control signal CTRL2 and the measured power value MPW, and third performance controller 41 may provide a third performance control value PFC3 to the third internal circuit 42 based on the third control signal CTRL3 and the measured power value MPW.

In some example embodiments, as illustrated in FIG. 1, the performance control values PFC1, PFC2 and PFC3 may be provided directly to the internal circuits 22, 32 and 33, respectively. In this case, each of the internal circuits may include an element configured to control an operation voltage and/or an operation frequency for power control.

In some example embodiments, as will be described below with reference to FIG. 25, the multi-component device 14 may further include a power management integrated circuit (PMIC) configured to control overall power of the multi-component device 14. In this case, the performance control values PFC1, PFC2 and PFC3 may be provided to the PMIC directly or indirectly through the internal circuits 22, 32 and 42.

In some example embodiments, each of the components 20, 30 and 40 may include a temperature sensor configured to generate an operation temperature value indicating an operation temperature of each of the components 20, 30 and 40 by measuring the operation temperature. The first component 20 may include a first temperature sensor TS1 to generate a first operation temperature value MT1 including the operation temperature of the first component 20, the second component 30 may include a second temperature sensor TS2 to generate a second operation temperature value MT2 including the operation temperature of the second component 30, and the third component 40 may include a third temperature sensor TS3 to generate a third operation temperature value MT3 including the operation temperature of the third component 40.

In this case, as will be described below with reference to FIGS. 4 and 5, the non-priority component may operate with variable performance based on the target power value TPW, the measured power value MPW, the operation temperature value and a target temperature value indicating a limit of the operation temperature. The operation stability of the multi-component device 14 may be enhanced by controlling the performance considering the operation temperature in addition to the power.

In some example embodiments, the multi-component device 14 in FIG. 1 may be a storage device as will be described with reference to FIGS. 11 through 15. In this case, one of the components 20, 30 and 40 may correspond to a solid state drive (SSD) and another one of the components 20, 30 and 40 may correspond to a field programmable gate array (FPGA). The descriptions with reference to FIGS. 1 through 10 may be applied to the storage device 1200, and the FPGA 1210 and the SSD included in the storage device 1200 as will be described below.

Figure 2:
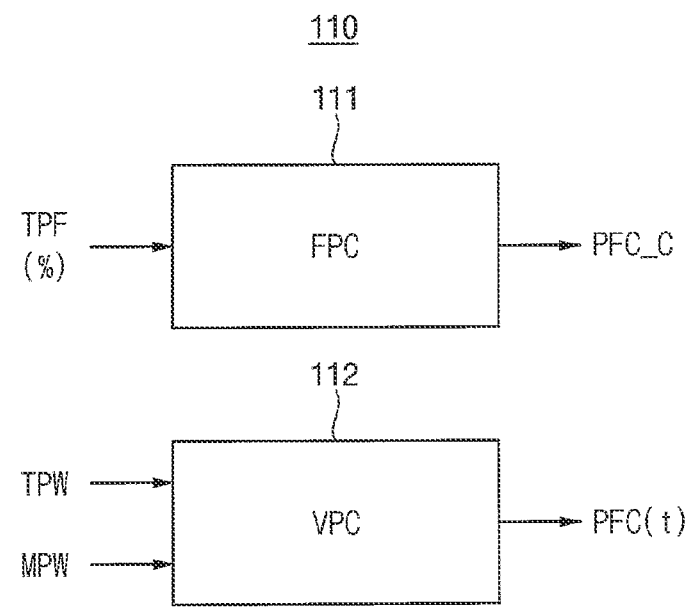
FIG. 2 is a diagram illustrating an example embodiment of a performance controller included in the multi-component device in FIG. 1.

FIG. 2 is a diagram illustrating an example embodiment of a performance controller included in the multi-component device in FIG. 1.

Referring to FIG. 2, a performance controller 110 included in each component may include a fixed performance controller FPC 111 and a variable performance controller VPC 112.

The fixed performance controller 111 may be enabled when the corresponding component is determined as the priority component and generate a fixed performance control value PFC_C based on the target performance value TPF to control performance of the corresponding component. The global controller 60 may receive a ratio (e.g., a percentage (%)) of the fixed performance with respect to a maximum performance of the priority component as the target performance value TPF from the host device 12 and provide the ratio as the target performance value TPF to the fixed performance controller 111.

The variable performance controller 112 may be enabled when the corresponding component is determined as the non-priority component and generate a variable performance control value PFC(t) based on the target power value TPW and the measured power value MPW to control performance of the corresponding component.

As a result, the fixed performance control value PFC_C may be provided to the internal circuit of the priority component and the variable performance control value PFC_V may be provided to the internal circuit of the non-priority component.

Figure 3:
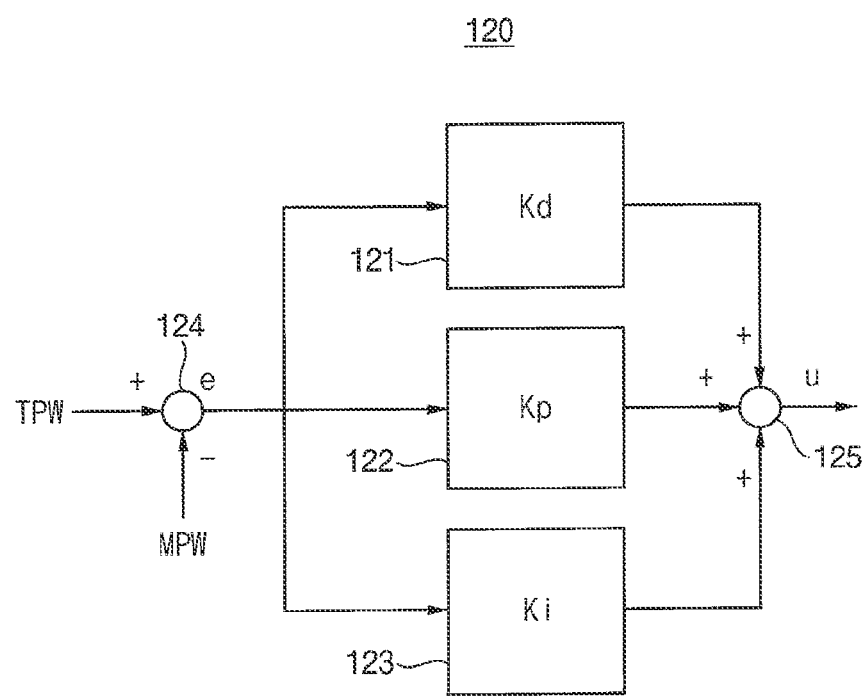
FIGS. 3, 4 and 5 are diagrams illustrating example embodiments of a variable performance controller included in the performance controller of FIG. 2.
Figure 4:
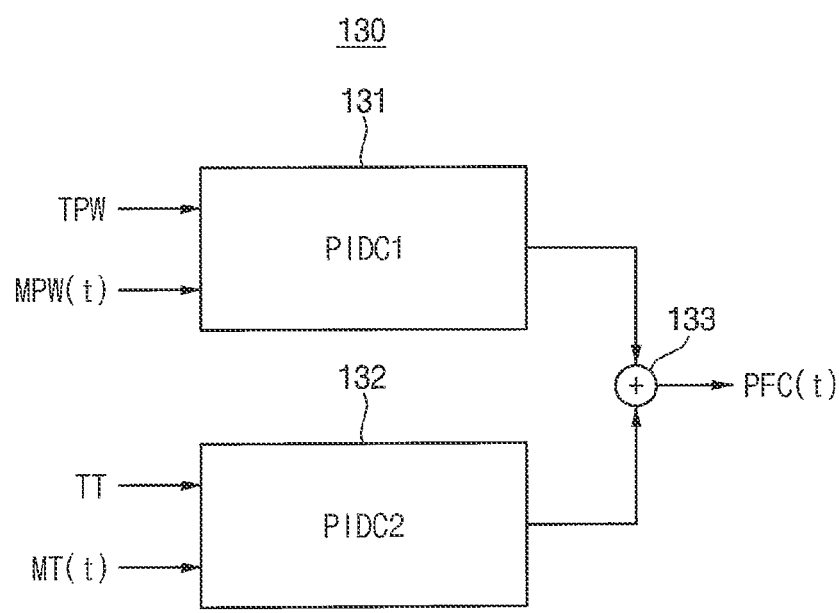
Figure 5:
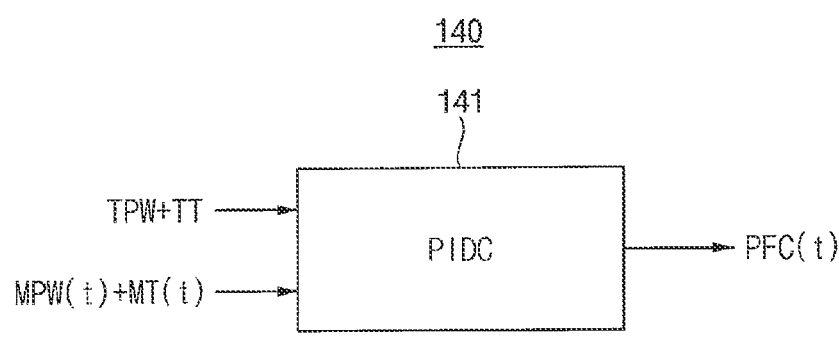

FIGS. 3, 4 and 5 are diagrams illustrating example embodiments of a variable performance controller included in the performance controller of FIG. 2.

FIG. 3 illustrates a conceptual configuration of a proportional-integral-differential (PID) controller. The first, second and third variable performance controllers VPC1, VPC2 and VPC3 in FIG. 1 may be implemented with a PID controller as described with reference to FIG. 3.

Referring to FIG. 3, a PID controller 120 may include a differential control unit 121, a proportional control unit 122, an integral control unit 123, a subtraction unit 124 and an addition unit 125.

The subtraction unit 124 subtracts the measured power value MPW from the target power value TPW and provides a difference value e(t) to the differential control unit 121, the proportional control unit 122 and the integral control unit 123. The addition unit 125 sums the outputs of the differential control unit 121, the proportional control unit 122 and the integral control unit 123 and provides a variable performance control value u(t). The difference value e(t) and the variable performance control value u(t) are expressed as a function of time and satisfy the following equation.

$$u(t) = k_p e(t) + k_i \int_0^t e(\tau) d\tau + k_d \frac{de(t)}{dt}$$

In the above equation, Kp indicates a proportional gain, Ki indicates an integral gain and Kd indicates a differential gain. The measured power value MPW is varied depending on the variable performance control value u(t), and the measured power value MPW corresponding to the variable performance control value u(t) is fed back to the subtraction unit 124. Through such feedback loop operation, the variable performance control value u(t) may be generated such that the measured power value MPW may converge to the target power value TPW.

The proportional control unit 122 outputs a value proportional to the error or the difference value e=TPW−MPW and the proportional gain Kp may be determined as a proper value through various methods. As the proportional gain Kp is increased, the variability of the variable performance control value u(t) increases and the variable performance control value u(t) may converge rapidly. If the proportional gain Kp is too small, the response is slow and thus the variable performance control value u(t) may not converge. If the proportional gain Kp is too great, the response is rapid but overshoot may be caused. The integral control unit 123 integrates the difference value e(t) and outputs integrated value to remove a steady state error.

Using the PID controller 120, the variable performance controller in each component may generate the variable performance control value u(t) based on the target power value TPW and the measured power value MPW such that the measured power value MPW may converge to the target power value TPW. The variable performance control value PFC(t) in FIG. 2 may be equal to or generated based on the output u(t) of the PID controller 120 of FIG. 3.

FIGS. 4 and 5 illustrate example embodiments of a variable performance controller operating based on an operation temperature in addition to power.

Referring to FIG. 4, a variable performance controller 130 may include a first PID controller 131, a second PID controller 132 and an addition unit 133. The configuration and operation of the first PID controller 131 and the second PID controller 132 are the same as described with reference to FIG. 3.

The first PID controller 131 may generate a first output value based on a difference between the target power value TPW and the measured power value MPW(t) varying over time such that the measured power value MPW(t) may converge to the target power value TPW as described with reference to FIG. 3.

The second PID controller 132 may generate a second output value based on a difference between a target temperature value TT and an operation temperature value MT(t) or a measured temperature value MT(t) varying over time such that the measured temperature value MT(t) may converge to the target temperature value TT.

The addition unit 133 may sum the first output value from the first PID controller 131 and the second output value from the second PID controller 132 and generate a final variable performance control value PFC(t) reflecting the operation temperature and the power.

Referring to FIG. 5, a variable performance controller 140 may be implemented with a single PID controller 141. The configuration and operation of the PID controller 141 are the same as described with reference to FIG. 3.

The PID controller 141 may receive a target value TPW+TT, corresponding to a sum of a target power value TPW and a target temperature value TT, and a measure value MPW(t)+MT(t) corresponding to a sum of a measured power value MPW(t) and a measure temperature value MT(t). The PID controller 141 may generate a variable performance control value PFC(t) based on a difference between the target value TPW+TT and the measure value MPW(t)+MT(t) such that the measure value MPW(t)+MT(t) may converge to the target value TPW+TT.

Using the variable performance controllers 130 and 140 as described with reference to FIGS. 4 and 5, the non-priority component may operate with the variable performance based on the target power value TPW, the measured power value MPW(t), the operation temperature value MT(t) and the target temperature value TT indicating a limit of the operation temperature. The operation stability of the multi-component device 14 may be enhanced by controlling the performance considering the operation temperature in addition to the power.

Figure 6:
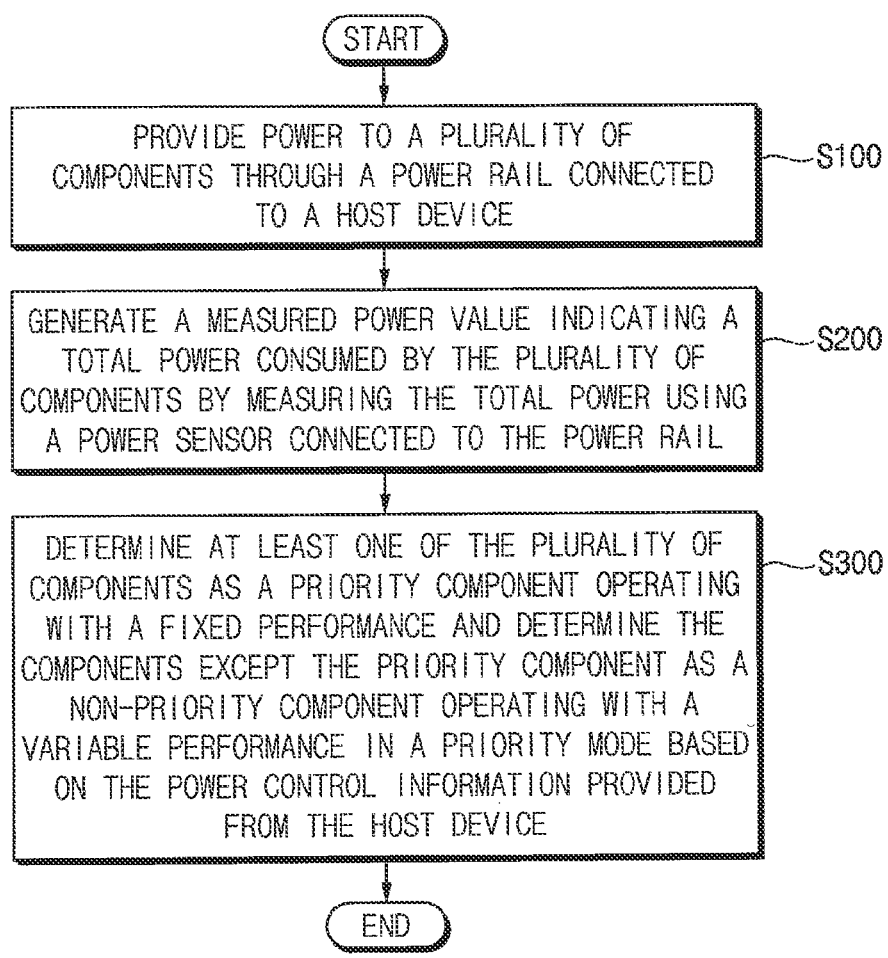
FIG. 6 is a flow chart illustrating a method of controlling an operation of a multi-component device according to example embodiments.

FIG. 6 is a flow chart illustrating a method of controlling an operation of a multi-component device according to example embodiments.

Referring to FIGS. 1 through 6, power may be provided to the plurality of components 20, 30 and 40 through the power rail 16 connected to the host device 12 (S100).

The measured power value MPT indicating the total power consumed by the plurality of components 20, 30 and 40 may be generated by measuring the total power using the power sensor 50 connected to the power rail 16 (S200).

Using the global controller 60, at least one of the plurality of components 20, 30 and 40 may be determined as the priority component operating with the fixed performance and the components except the priority component may be determined as the non-priority components operating with the variable performance in the priority mode based on the power control information PCINF provided from the host device 12 (S300).

Figure 7:
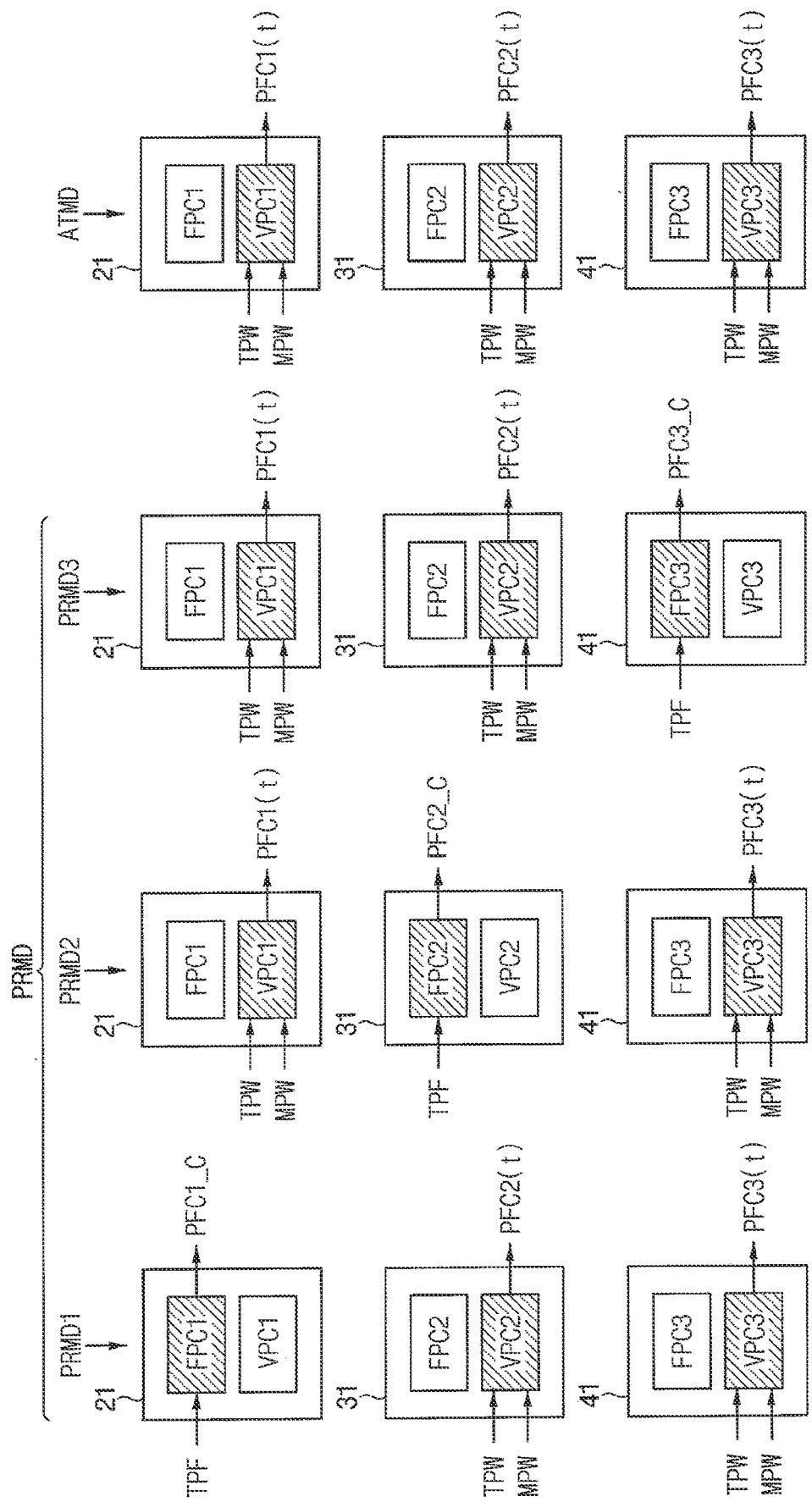
FIG. 7 is a diagram illustrating operation modes by a method of controlling an operation of a multi-component device according to example embodiments.

FIG. 7 is a diagram illustrating operation modes by a method of controlling an operation of a multi-component device according to example embodiments.

Referring to FIG. 7, operation modes of a multi-component device according to example embodiments may include a priority mode PRMD and a non-priority mode ATMD. The non-priority mode ATMD may be referred to as an all-throttling mode.

The priority mode PRMD may include a first priority mode PRMD1 in which the first component 20 in FIG. 1 is determined as the priority component, a second priority mode PRMD2 in which the second component 30 in FIG. 1 is determined as the priority component, and a third priority mode PRMD3 in which the third component 40 in FIG. 1 is determined as the priority component.

In the first priority mode PRMD1, the global controller 60 in FIG. 1 may enable the first fixed performance controller FPC1 of the first performance controller 21, the second variable performance controller VPC2 of the second performance controller 31 and the third variable performance controller VPC3 of the third performance controller 41. The first fixed performance controller FPC1 may generate the first fixed performance control value PFC1_C based on the target performance value TPF, and the second and third variable performance controllers VPC2 and VPC3 may generate the second and third variable performance control values PFC2($t$) and PFC3($t$) based on the target power value TPW and the measured power value MPW, respectively.

In the second priority mode PRMD2, the global controller 60 in FIG. 1 may enable the second fixed performance controller FPC2 of the second performance controller 31, the first variable performance controller VPC1 of the first performance controller 21 and the third variable performance controller VPC3 of the third performance controller 41. The second fixed performance controller FPC2 may generate the second fixed performance control value PFC2_C based on the target performance value TPF, and the first and third variable performance controllers VPC1 and VPC3 may generate the first and third variable performance control values PFC1($t$) and PFC3($t$) based on the target power value TPW and the measured power value MPW, respectively.

In the third priority mode PRMD3, the global controller 60 in FIG. 1 may enable the third fixed performance controller FPC3 of the third performance controller 41, the first variable performance controller VPC1 of the first performance controller 21 and the second variable performance controller VPC2 of the second performance controller 31. The third fixed performance controller FPC3 may generate the third fixed performance control value PFC3_C based on the target performance value TPF, and the first and second variable performance controllers VPC1 and VPC2 may generate the first and second variable performance control values PFC1($t$) and PFC2($t$) based on the target power value TPW and the measured power value MPW, respectively.

In the non-priority mode ATMD, all of the first, second and third components 20, 30 and 40 may be determined as the non-priority component. In the non-priority mode ATMD, the global controller 60 in FIG. 1 may enable the first, second and third variable performance controllers VPC1, VPC2 and VPC3 of the first, second and third performance controllers 21, 31 and 41, and disable the first, second and third fixed performance controllers FPC1, FPC2 and FPC3. The first, second and third variable performance controllers VPC1, VPC2 and VPC3 may generate the first, second and third variable performance control values PFC1($t$), PFC2($t$) and PFC3($t$) based on the target power value TPW and the measured power value MPW, respectively.

In the priority mode PRMD, one component may operate with the fixed performance and the other components may operate with the variable performance based on the target power value TPW and the measured power value MPW such that the total power of the multi-component device may not exceed the power limit. In the non-priority mode ATMD, all components may operate with the variable performance based on the target power value TPW and the measured power value MPW such that the total power of the multi-component device may not exceed the power limit.

As such, the multi-component device and the method of controlling the operation of the multi-component device according to example embodiments may efficiently implement performance balance and observe the power limit without prediction of powers of the respective components, through the priority mode in which at least one component is controlled to operate as the priority component having the fixed performance and the other components are controlled to operate as the non-priority components having the variable performance.

Figure 8:
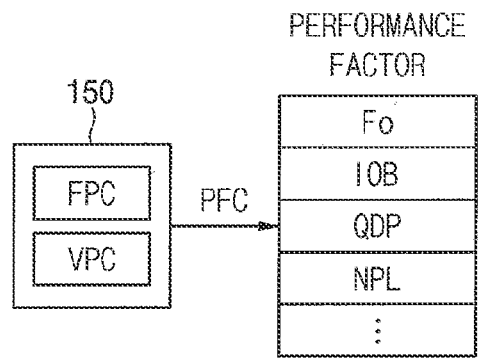
FIG. 8 is a diagram illustrating example embodiments of performance factors corresponding to a performance control value generated from a performance controller included in a multi-component device according to example embodiments.

FIG. 8 is a diagram illustrating example embodiments of performance factors corresponding to a performance control value generated from a performance controller included in a multi-component device according to example embodiments.

Referring to FIG. 8, various performance factors may be adjusted based on a performance control value PFC generated from a performance controller 150. The performance factors may include an operation frequency Fo, an input-output bandwidth IOB, a queue depth QDP indicating a maximum number of requests stored in a request queue, a maximum number NPL of memory planes that may be activated simultaneously, etc.

Figure 9:
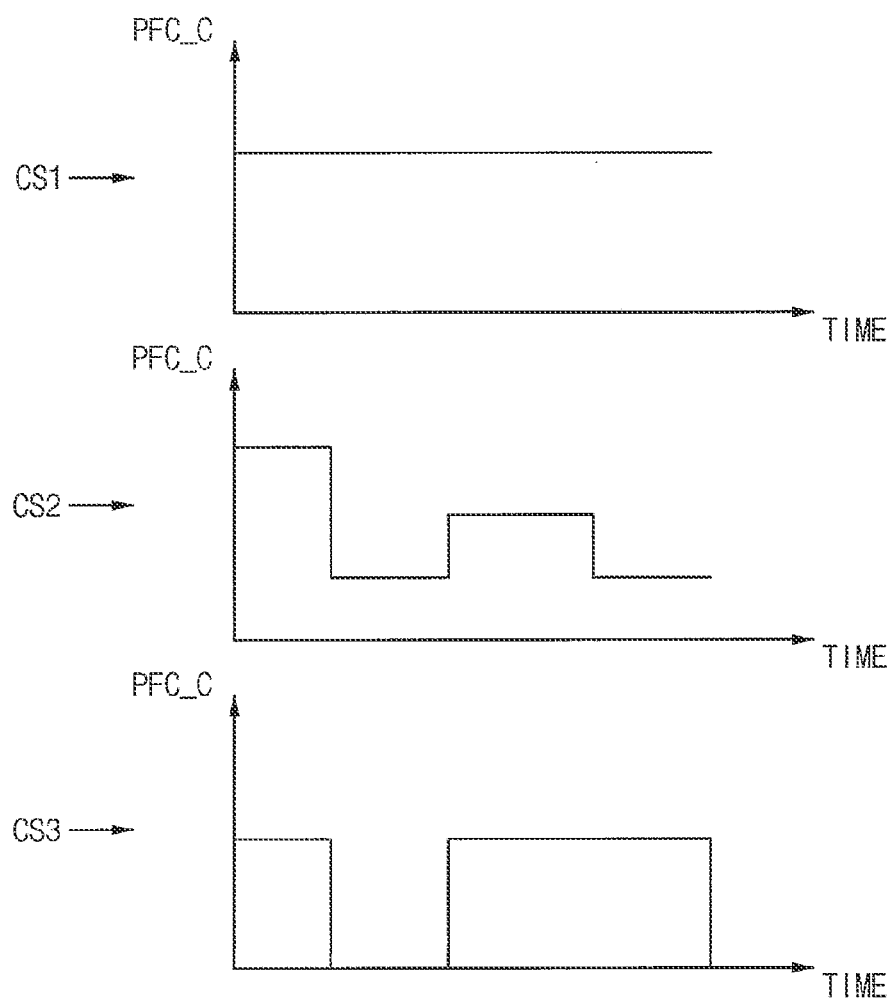
FIGS. 9 and 10 are diagrams illustrating example embodiments of a fixed performance control value generated from a performance controller included in a multi-component device according to example embodiments.
Figure 10:
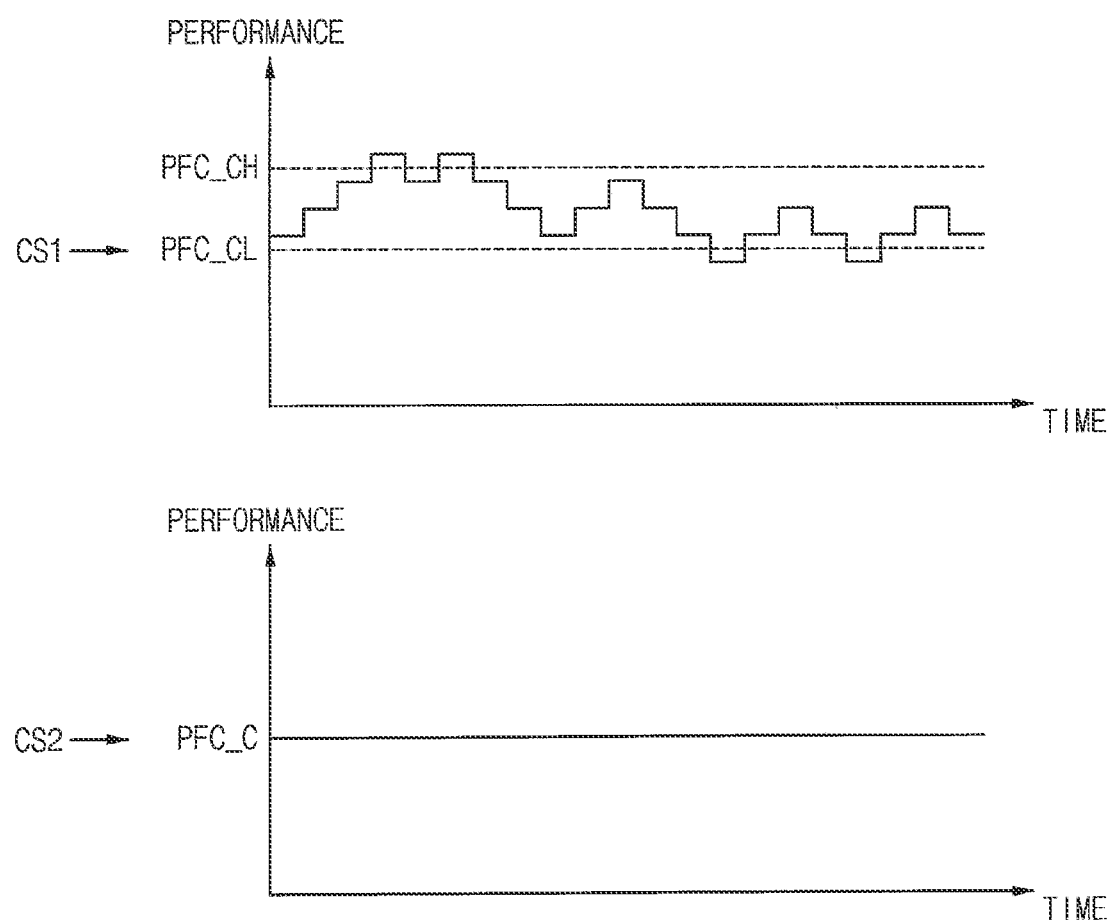

FIGS. 9 and 10 are diagrams illustrating example embodiments of a fixed performance control value generated from a performance controller included in a multi-component device according to example embodiments.

Referring to FIG. 9, the fixed performance control value PFC_C may have various profiles over time. A first case CS1 shows that the fixed performance control value PFC_C is maintained without change. A second case CS2 shows that the fixed performance control value PFC_C is varied with a predetermined time interval, and a third case CS3 shows that the fixed performance control value PFC_C is switched by an on and off scheme. The profile of the fixed performance control value PFC_C may be determined depending on a type of tasks performed by the corresponding priority component. In some example embodiments, a proper profile of the fixed performance control value PFC_C may be determined by performing deep learning using an artificial neural network.

Referring to FIG. 10, the fixed performance control value may be provided as a high limit value PFC_CH and a low limit value PFC_CL as a first case CS1 or a single value PFC_C as a second case CS2. In the first case CS1, the priority component may perform a throttling operation such that the performance may be varied between the high limit value PFC_CH and the low limit value PFC_CL. In the second case CS2, the performance of the priority component may be maintained constantly.

Figure 11:
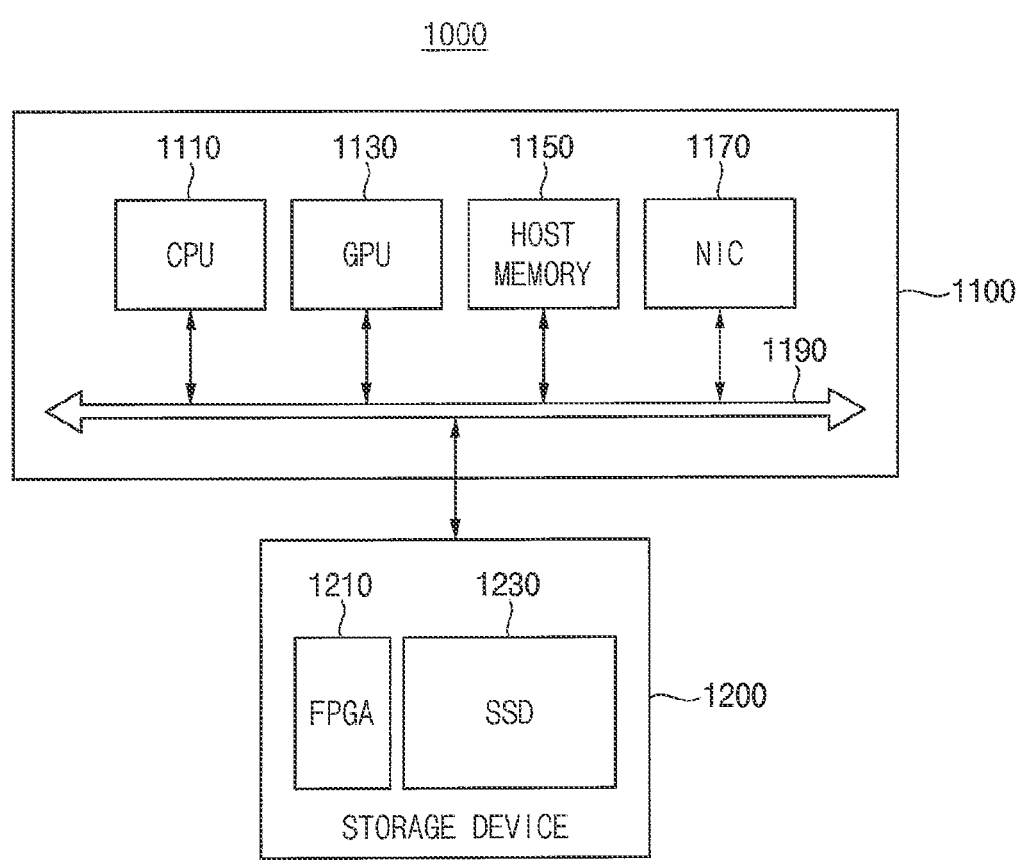
FIG. 11 is a block diagram illustrating a system including a storage device according to example embodiments.

FIG. 11 is a block diagram illustrating a system including a storage device according to example embodiments.

A computing system 1000 of FIG. 11 may be one of a desktop computer, a laptop computer, a tablet computer, a smartphone, a wearable device, a server, an electric vehicle, home applications, etc.

Referring to FIG. 11, the computing system 1000 may be roughly divided into a host device 1100 and a storage device 1200.

The host device 1100 may perform various arithmetic/logical operations for the purpose of controlling overall operations of the computing system 1000. The host device 1100 may include a central processing unit (CPU) 1110, a graphic processing unit (GPU) 1130, a host memory 1150, a network interface card (NIC) 1170, and an interface circuit 1190. Alternatively, the host device 1100 may be a device which includes one or more processor cores, such as for example a general-purpose CPU, a dedicated application specific integrated circuit (ASIC), or an application processor.

The central processing unit 1110 executes a variety of software (e.g., an application program, an operating system, and a device driver) loaded onto the host memory 1150. The central processing unit 1110 may execute an operating system (OS) and application programs. The central processing unit 1110 may be implemented for example with a homogeneous multi-core processor or a heterogeneous multi-core processor. In particular, the central processing unit 1110 may request the storage device 1200 to process a data intensive work load operation such as data compression, data encryption, data processing, etc.

The graphics processing unit 1130 performs various graphic operations in response to a request of the central processing unit 1110. That is, the graphics processing unit 1130 may convert process-requested data to data suitable for display. A streaming access to the storage device 1200 may also be requested by the graphics processing unit 1130. The graphics processing unit 1130 has an operation structure that is suitable for parallel processing in which similar operations are repeatedly processed. Accordingly, graphics processing units such as graphics processing unit 1130 are currently being developed to have a structure that may be used to perform various operations requiring high-speed parallel processing as well as graphic operations. For example, the graphics processing unit 1130 that processes a general-purpose operation as well as a graphic processing operation is called a general purpose computing on graphics processing units (GPGPU). The GPGPU may for example be used to analyze a molecular structure, to decrypt a code, or to predict a meteorological change in addition to video decoding.

The host memory 1150 may store data that are used to operate the computing system 1000. For example, the host memory 1150 may store data processed or to be processed by the host device 1100. The host memory 1150 may include volatile/nonvolatile memory such as for example static random access memory (SRAM), dynamic RAM (DRAM), synchronous DRAM (SDRAM), phase-change RAM (PRAM), ferro-electric RAM (FRAM), magneto-resistive RAM (MRAM), and resistive RAM (ReRAM).

The network interface card 1170 is a communication interface for connecting an Ethernet switch (not illustrated) or an Ethernet fabric with the computing system 1000. For example, in the case where the Ethernet switch corresponds to a wired LAN network, the network interface card 1170 may be implemented with a wired LAN card. Of course, even in the case where the Ethernet switch is a wireless LAN, the network interface card 1170 may be implemented with hardware that processes a communication protocol corresponding to the wireless LAN.

The interface circuit 1190 provides a physical connection between the host device 1100 and the storage device 1200. That is, the interface circuit 1190 may convert a command, an address, data, etc. which correspond to various access requests generated from the host device 1100, so to be suitable for an interface manner with the storage device 1200. The interface circuit 1190 may be configured according to any of a variety of different communication protocols such as for example Universal Serial Bus (USB), Small Computer System Interface (SCSI), Peripheral Component Interface express (PCIe), Advanced Technology Attachment (ATA), parallel ATA (PATA), serial ATA (SATA), serial attached SCSI (SAS), and universal flash storage (UFS).

The storage device 1200 may store data regardless of whether power is supplied. For example, the storage device 1200 may include storage mediums such as for example solid state drives (SSDs), secure digital (SD) cards, embedded multimedia cards (eMMC), or the like. In some example embodiments, the storage device 1200 may include a field programmable gate array (FPGA) 1210 and an SSD 1230.

The FPGA 1210 may access the SSD 1230 in response to a request from the host device 1100. For example, the FPGA 1210 may transfer a streaming access command to the SSD 1230 in response to a data request from the host device 1100. The streaming access command may include information of a logical block address (LBA) list, a stream identifier (ID), a chunk size, a priority, etc. The storage device 1200 including the FPGA 1210 and the SSD 1230 may be referred to as a smart SSD or a computational SSD.

The FPGA 1210 may process within the storage device 1200 stream data provided from the SSD 1230 in response to the streaming access command Result data processed by the FPGA 1210 may be returned to the host device 1100. The above operation of the FPGA 1210 may make it possible to markedly improve (or minimize) a decrease in a bandwidth due to the exchange of stream data between the storage device 1200 and the host device 1100.

The SSD 1230 stores or outputs data in response to a request provided from the host device 1100 or the FPGA 1210. The SSD 1230 may provide stream data in units of a requested data size in response to the streaming access command (e.g., a streaming read command or a streaming write command) For example, in the case where requested data are stored in a buffer (not illustrated), the SSD 1230 may allow a DMA engine (not illustrated) of the FPGA 1210 to sequentially read data stored in the buffer.

In some example embodiments, the storage device 1200 may be a removable device that may be selectively connected to an electronic device including the host device 1100. For example, the host device 1100 may be mounted on a main board of the electronic system and the storage device 1200 may be attached to a socket of the electronic device such that the storage device 1200 may be electrically connected to the host device 1100.

In some example embodiments, the storage device 1200 may be an embedded device that is integrated together with the host device 1100 in the electronic device. In this case, the storage device 1200 may be electrically connected to the host device 1100 through an internal system bus of the electronic device.

Figure 12:
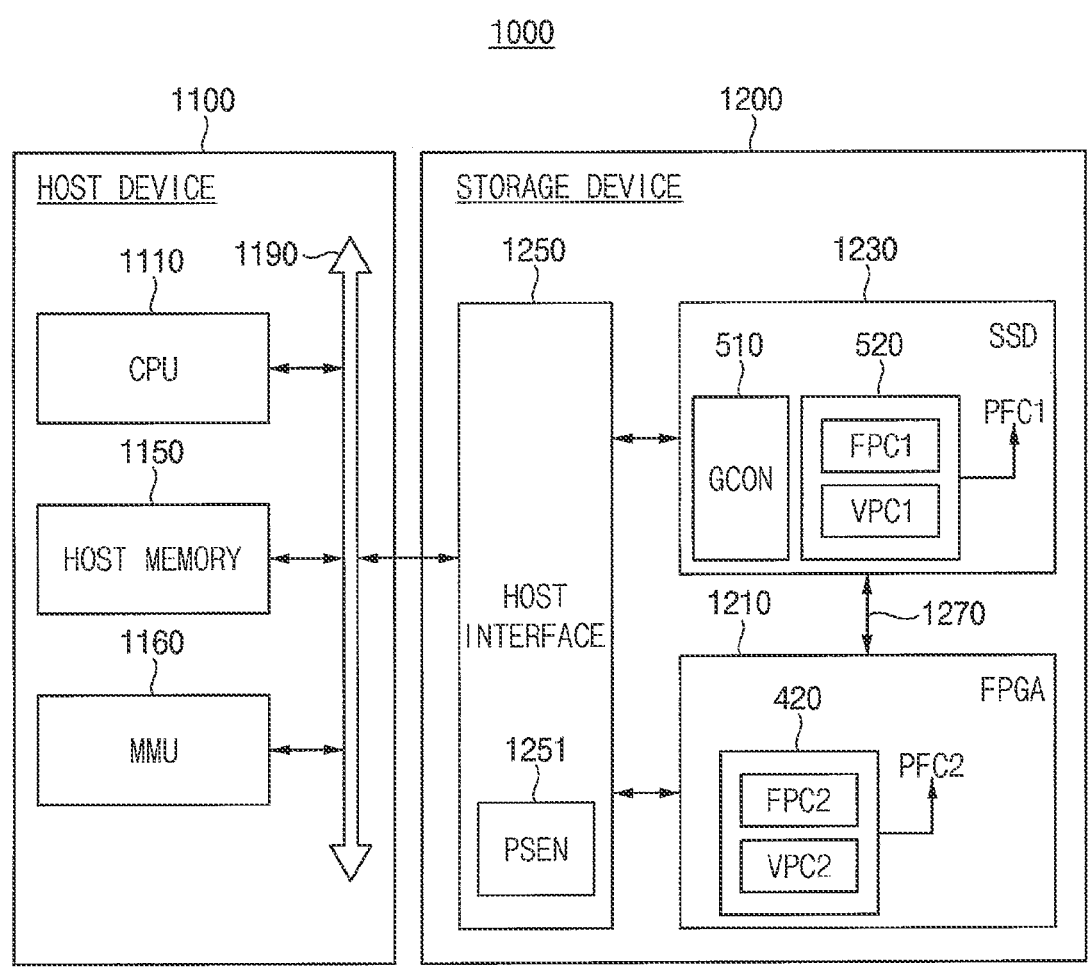
FIG. 12 is a block diagram illustrating an example configuration of the system of FIG. 11.

FIG. 12 is a block diagram illustrating an example configuration of the system of FIG. 11.

Referring to FIG. 12, the host device 1100 and the storage device 1200 constitute the computing system 1000.

The host device 1100 may include the central processing unit CPU 1110, the host memory 1150, the interface circuit 1190, and a memory management unit MMU 1160. It should be understood that the host device 1100 further includes components such as the graphics processing unit 1130 and the network interface card 1170. However, for convenience of description, some functions of the components of the host device 1100 may not be here described and/or some of the components may not be illustrated. The central processing unit 1110, the host memory 1150, and the interface circuit 1190 are substantially the same as those of FIG. 11, and thus, additional description may be omitted to avoid redundancy.

Figure 14:
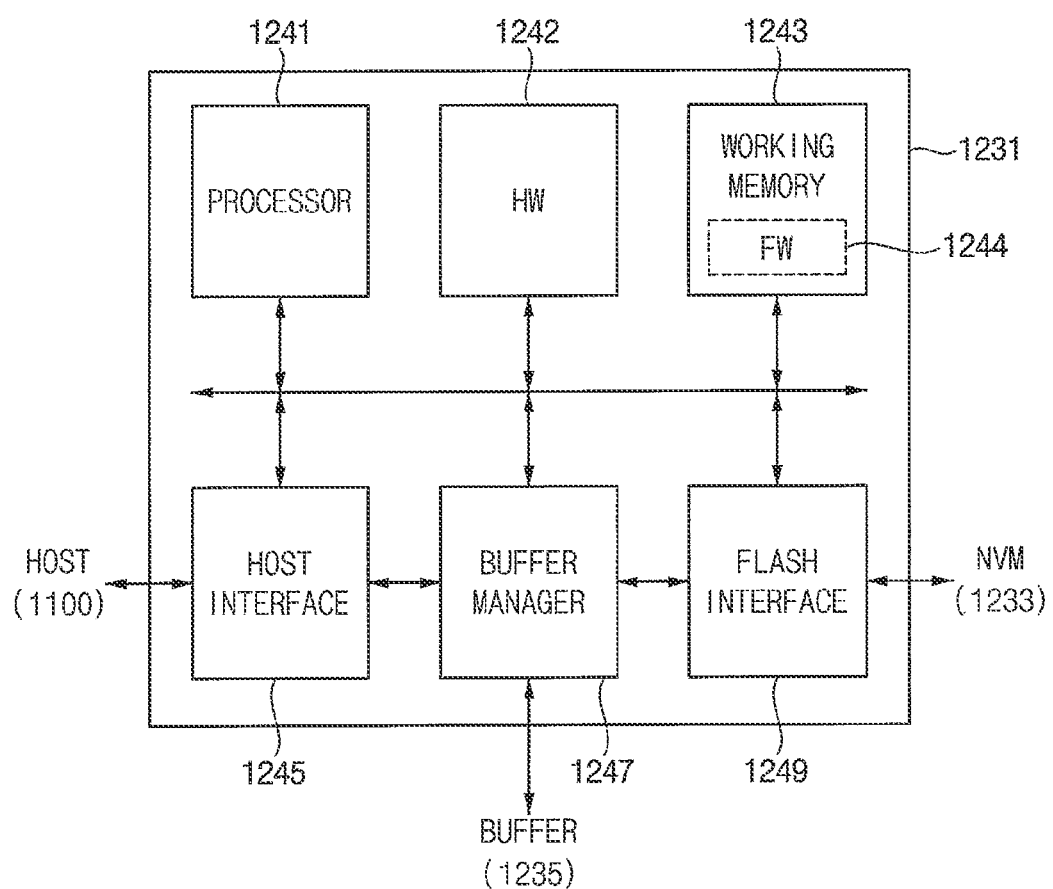
FIG. 14 is a block diagram illustrating an example embodiment of an SSD controller included in the SSD of FIG. 13.

The host device 1100 may map a buffer 1235 in FIG. 14 of the SSD 1230 onto a virtual memory space of the host device 1100. In general, a storage device such as the SSD 1230 does not open the buffer 1235, which is a memory space for direct memory access (DMA), for any other device. Accordingly, the host device 1100 may register the buffer 1235 at a virtual memory space to manage the buffer 1235 through one map, and thus, the buffer 1235 may be freely accessible by a DMA engine of the FPGA 1210. To this end, the host device 1100 may include the memory management unit 1160. During booting or initialization of the computing system 1000, the buffer 1235 may be opened to an external device for transmission of stream data by mapping a physical address region of the buffer 1235 of the SSD 1230 onto a virtual memory space. An access of an external device to the virtual memory space may be redirected to the buffer 1235 by the memory management unit 1160.

The storage device 1200 processes data provided from the host device 1100 or the SSD 1230 in an in-storage computing manner in response to a request of the host device 1100. The storage device 1200 may return a result of the in-storage computing to the host device 1100. To this end, the storage device 1200 may include the FPGA 1210, the SSD 1230, and a host interface 1250.

The host interface 1250 is provided as a physical communication channel of the storage device 1200, which is used for data exchange with the host device 1100. The host interface 1250 may have an interfacing protocol supporting DMA functions of the FPGA 1210 and the SSD 1230. For example, the buffer 1235 of the SSD 1230 may be managed in the virtual memory space by the memory management unit 1160 of the host device 1100 and the host interface 1250.

The SSD 1230 and the FPGA 1210 may be connected directly through an internal bus 1270. For example, the internal bus 1270 may be an inter-integrated circuit (I2C) bus.

The SSD 1230 may store data and receive power through a power rail connected to the host device 1100. The FPGA 1210 may process data read from the SSD 1230 or data to be stored in the SSD 1230 and receive power through the power rail. A power sensor PSEN 1251 may be connected to the power rail and generate a measured power value corresponding to a total power consumed by the SSD 1230 and the FPGA 1210 by measuring the total power.

The SSD 1230 may include a global controller GCON 510 and a first performance controller 520. The FPGA 1210 may include a second performance controller 420.

The first performance controller 520 may include a first fixed performance controller FPC1 and a first variable performance controller VPC1. The second performance controller 420 may include a second fixed performance controller FPC2 and a second variable performance controller VPC2. As described with reference to FIG. 1, the first performance controller 520 may generate a first performance control value PFC1 to control the power and the performance of the SSD 1230, and the second performance controller 420 may generate a second performance control value PFC2 to control the power and the performance of the FPGA 1210.

The global controller 510 may determine one of the SSD 1230 and the FPGA 1210 as a priority component operating with a fixed performance and determine the other of the SSD 1230 and the FPGA 1210 as a non-priority component operating with a variable performance in a priority mode based on power control information provided from the host device 1100.

FIG. 12 illustrates that the global controller 510 is included in the SSD 1230, but example embodiments are not limited thereto. According to example embodiments, the global controller may be disposed in the FPGA 1210 or the host device 1100.

Even though not illustrated in FIG. 12, the storage device 1200 may further include various elements. For example, the storage device 1200 may include a power management integrated circuit (PMIC) to control overall power of the storage device 1200, a clock generator to control an operation frequency of a clock signal of the storage device 1200, a voltage regulator to control an operation voltage of the storage device 1200, etc. For control of the power and/or the performance of the storage device 1200, the first performance control value PFC1 from the first performance controller 520 and the second performance control value PFC2 from the second performance controller 420 may be provided to the PMIC, the clock generator and/or the voltage regulator.

Figure 13:
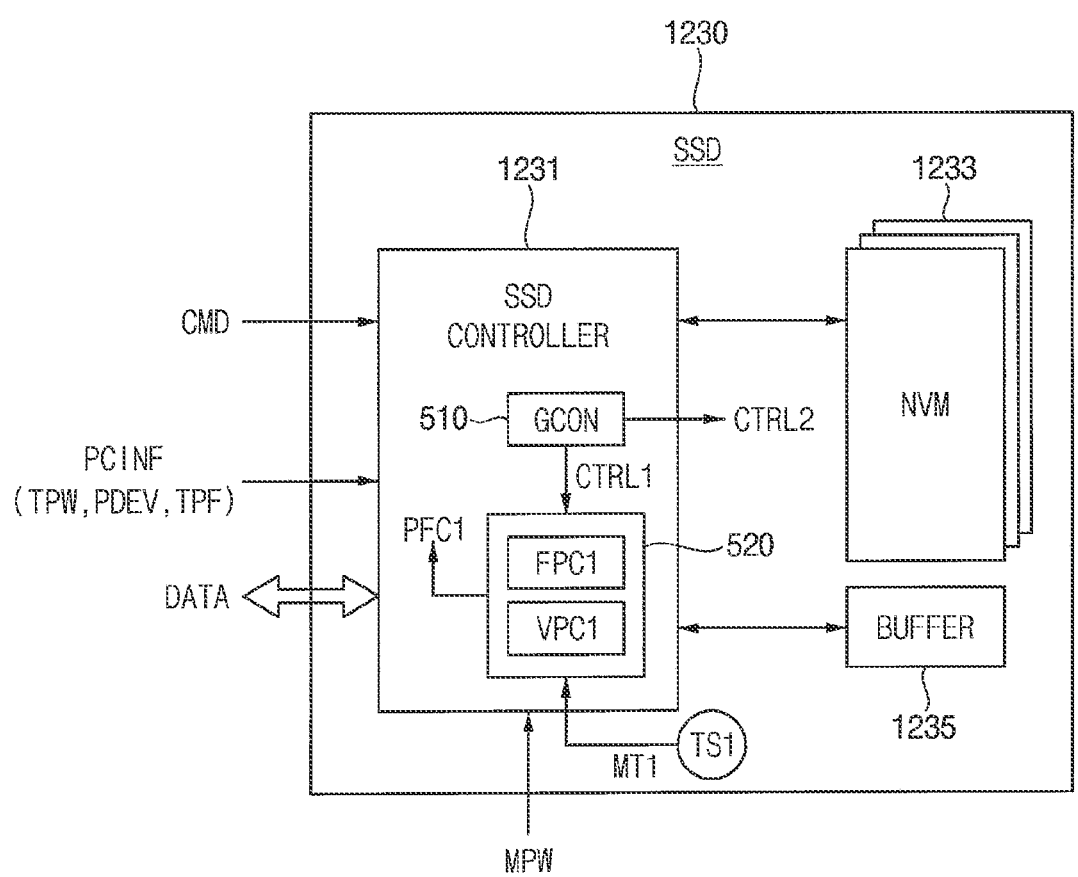
FIG. 13 is a block diagram illustrating a solid state drive (SSD) included in a storage device according to example embodiments.

FIG. 13 is a block diagram illustrating a solid state drive (SSD) included in a storage device according to example embodiments.

Referring to FIG. 13, the SSD 1230 may include an SSD controller 1231, a nonvolatile memory device(s) 1233, and a buffer 1235.

The SSD controller 1231 may provide interfacing between an external device and the SSD 1230. The SSD controller 1231 accesses the nonvolatile memory device 1233 with reference to a stream ID, an LBA list, and a chunk size included in the streaming access command provided from the outside. For example, in the case where the streaming access command corresponds to a read command, the SSD controller 1231 prefetches data corresponding to the LBA list from the nonvolatile memory device 1233 in a unit of the chunk size and loads the prefetched data onto the buffer 1235. In contrast, in the case where the streaming access command corresponds to a write command, the SSD controller 1231 may program write data (DATA) loaded onto the buffer 1235 from the outside in the unit of the chunk size in the nonvolatile memory device 1233. In some example embodiments, the SSD 1230 may further include a first temperature sensor TS1 to generate a fir measure temperature value MT1 by measuring an operation temperature of the SSD 1230.

The global controller 510 may generate a first control signal CTRL1 to control the first performance controller 520 of the SSD 1230 and a second control signal CTRL2 to control the second performance controller 420 of the FPGA 1210.

The power control information PCINF provided from the host device 12 may include a target power value TPW indicating a power limit of the storage device 1200, priority component information PDEV indicating the priority component among the SSD 1230 and the FPGA 1210 and a target performance value TPF indicating the fixed performance of the priority component. In some example embodiments, the power control information PCINF may be provided based on a command CMD that is transferred from the host device 1100 to the storage device 1200. The power control information PCINF may be included in the command CMD or may be provided through a data bus when the command CMD is transferred through a command-address bus. In some example embodiments, the power control information PCINF may be provided through control lines distinct from the command-address bus and the data bus.

FIG. 14 is a block diagram illustrating an example embodiment of an SSD controller included in the SSD of FIG. 13.

Referring to FIG. 14, the SSD controller 1231 may include a processor 1241, a hardware HW 1242, a working memory 1243, a host interface 1245, a buffer manager 1247, and a flash interface 1249. According to example embodiments, the global controller 510 and the first performance controller 520 may be implemented with the firmware FW 1244, the hardware 1242 or a combination thereof. Even though not illustrated in FIG. 14, the SSD controller 1231 may further include a PMIC to control overall power of the storage device 1200. In this case, the second performance control value PFC2 generated from the FPGA 1210 in FIG. 12 may be provided to the PMIC in the SSD controller 1231 through the internal bus 1270.

The processor 1241 may execute the firmware 1244 loaded onto the working memory 1243. As the firmware 1244 is executed, the processor 1241 may transfer various control information necessary to perform a read/write operation to registers of the host interface 1245 and flash interface 1249. For example, in the case where the streaming access command is received from the outside, the streaming access command is stored in a command register (not illustrated) of the host interface 1245. The host interface 1245 may notify the processor 1241 that the read/write command is input to the processor 1241, based on the stored command. The processor 1241 may parse the streaming access command transferred to the host interface 1245 to control the buffer manager 1247 and the flash interface 1249.

The working memory 1243 may store data that are used to drive the SSD controller 1231. For example, various firmware 1244 to be executed by the SSD controller 1231 may be loaded onto the working memory 1243. For example, a flash translation layer (FTL) to be executed by the processor 1241 or a firmware image such as the global controller 510 and the first performance controller 520 according to example embodiments may be loaded onto the working memory 1243 and may be executed by the processor 1241.

The host interface 1245 provides a physical connection between the host device 1100 or an external device and the SSD 1230. That is, the host interface 1245 provides interfacing with the SSD 1230, which complies with a bus format of the host device 1100. The bus format of the host device 1100 may include for example at least one of Universal Serial Bus (USB), Small Computer System Interface (SCSI), Peripheral Component Interface express (PCIe), Advanced Technology Attachment (ATA), parallel ATA (PATA), serial ATA (SATA), a serial attached SCSI (SAS), NVMe, and NVMe over Fabrics (NVMe-oF).

The flash interface 1249 exchanges data with the nonvolatile memory device 1233. The flash interface 1249 writes data transferred from the buffer 1235 in the nonvolatile memory device 1233. The flash interface 129 may transfer the data read from the nonvolatile memory device 1233 to the buffer 1235.

Figure 15:
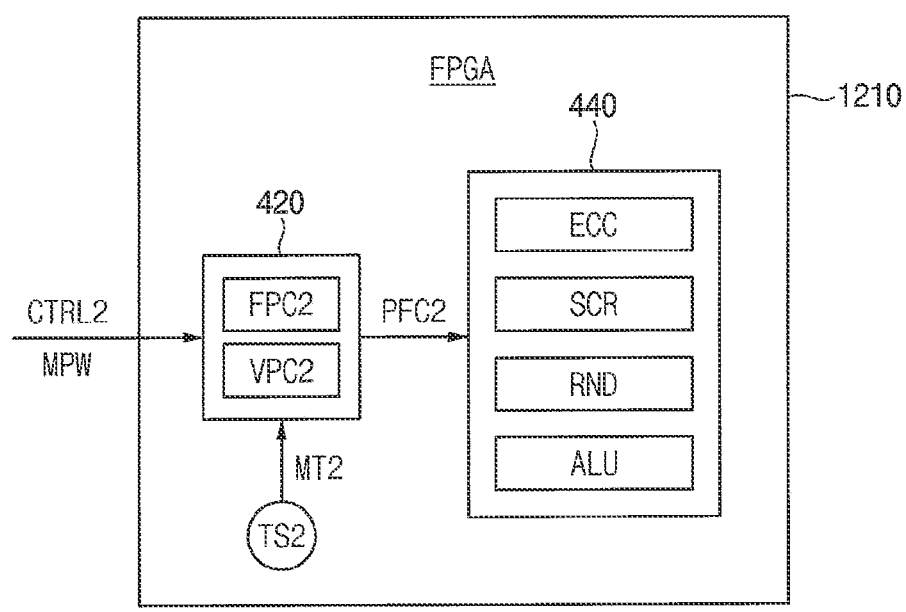
FIG. 15 is a block diagram illustrating a field programmable gate array (FPGA) included in a storage device according to example embodiments.

FIG. 15 is a block diagram illustrating a field programmable gate array (FPGA) included in a storage device according to example embodiments.

Referring to FIG. 15, the FPGA 1210 may include the second performance controller 420 and a processing unit 440.

The second performance controller 420 may generate the second performance control value PFC2 to control the performance and the power of the processing unit 440 based on the second control signal CTRL2 from the global controller 510 and the measured power value MPW from the power sensor 1251. The second performance control value PFC2 may be provided directly to the processing unit 440 as illustrated in FIG. 15. In some example embodiments, the second performance control value PFC2 may be provided to the PMIC as described above. In some example embodiments, the FPGA 1210 may further include a second temperature sensor TS2 to generate a second measure temperature value MT2 by measuring an operation temperature of the FPGA 1210.

The processing unit 440 may be implemented to perform various functions. For example, the processing unit 440 may include an error correction code engine ECC to perform encoding and decoding of data, a security circuit SCR to perform encryption and decryption of data, a randomizer RND to perform randomizing of data, an arithmetic logic unit ALU to perform calculation of data, etc.

Figure 16:
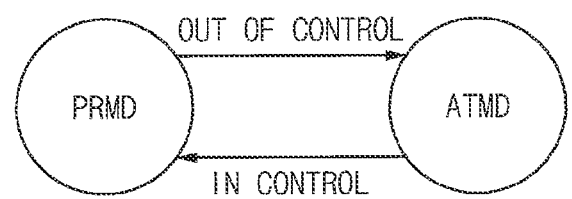
FIG. 16 is a conceptual diagram illustrating an example embodiment of an operation mode conversion in a storage device according to example embodiments.

FIG. 16 is a conceptual diagram illustrating an example embodiment of an operation mode conversion in a storage device according to example embodiments.

Figure 17:
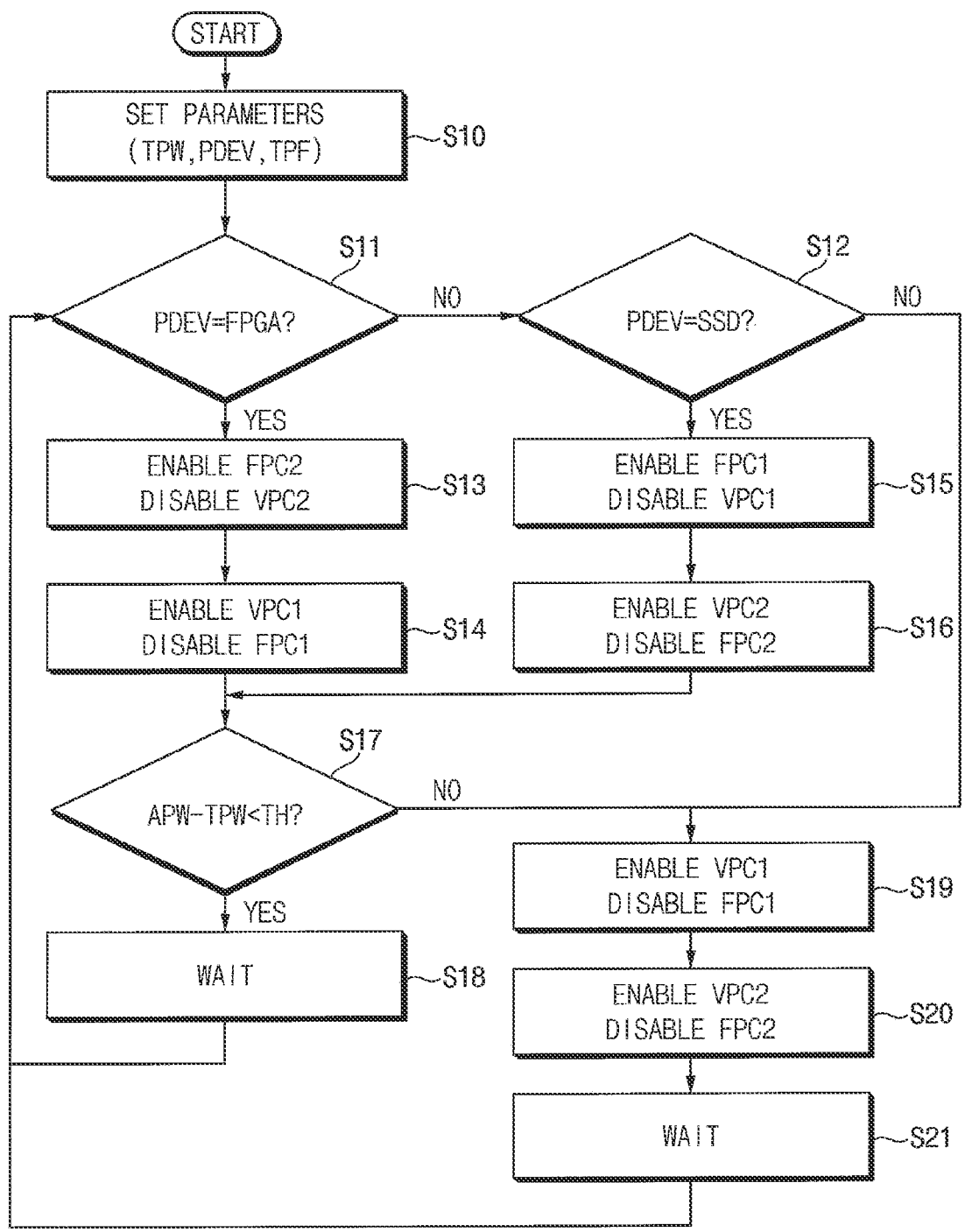
FIG. 17 is a flow chart illustrating a method of controlling an operation of a storage device according to example embodiments.

Referring to FIG. 16, the global controller may convert the operation mode of the storage device from the priority mode PRMD to the non-priority mode ATMD when it is determined that the power of the storage device is out of control during the priority mode PRMD. In contrast, the global controller may convert the operation mode of the storage device from the non-priority mode ATMD to the priority mode PRMD when it is determined that the power of the storage device is in control during the non-priority mode ATMD. FIG. 17 illustrates a method based on the operation mode conversion of FIG. 16.

Figure 18:
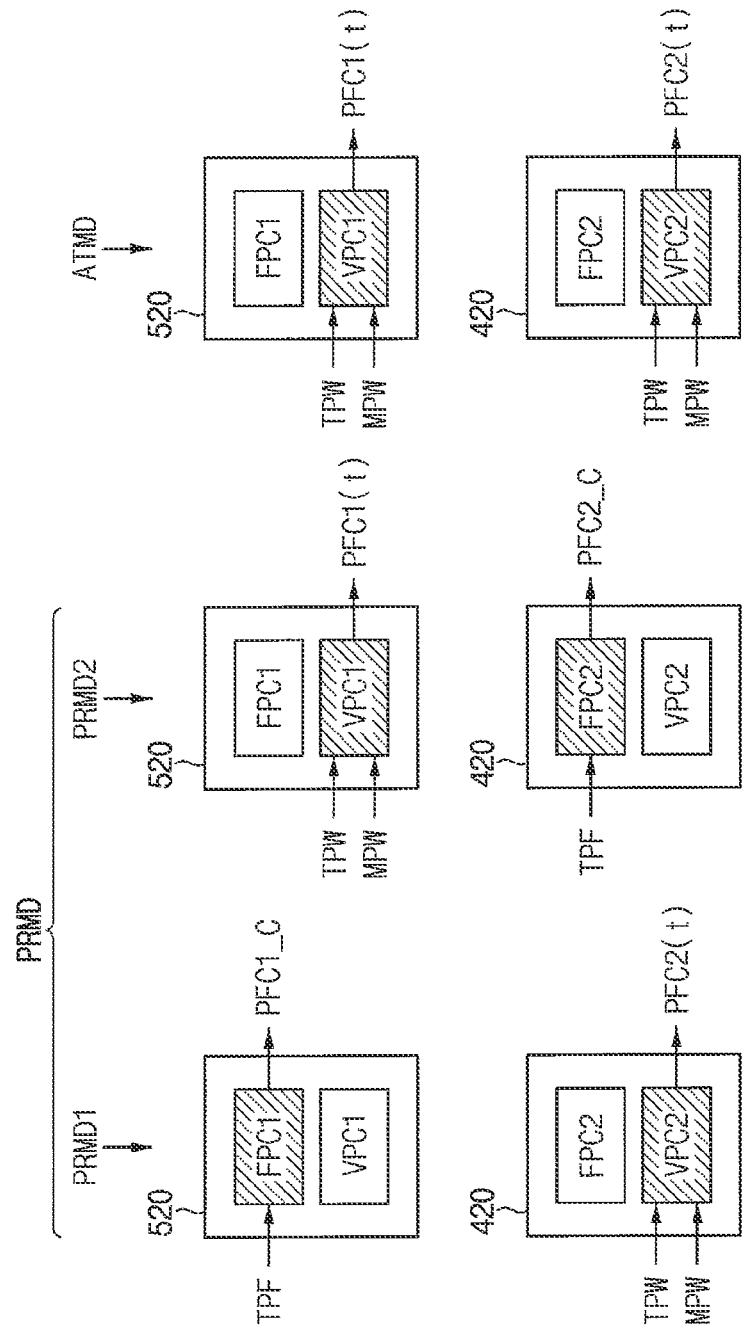
FIG. 18 is a diagram illustrating operation modes of a storage device according to the method of FIG. 17.

FIG. 17 is a flow chart illustrating a method of controlling an operation of a storage device according to example embodiments, and FIG. 18 is a diagram illustrating operation modes of a storage device according to the method of FIG. 17. The description repeated with FIGS. 11 through 16 may be omitted.

Referring to FIGS. 17 and 18, the global controller may set parameters based on the power control information PCINF provided from the host device (S10). As described above, the power control information PCINF may include the target power value TPW, the priority component information PDEV and the target performance value TPF.

When the global controller determines a second priority mode PRMD2 in which the FPGA is the priority component and the SSD is the non-priority component (S11: YES), the global controller may enable the second fixed performance controller FPC2 and the first variable performance controller VPC1, and disable the second variable performance controller VPC2 and the first fixed performance controller FPC1 (S13 and S14). Thus, the SSD may operate with the variable performance based on the first variable performance control value PFC1(t) and the FPGA may operate with the fixed performance based on the second fixed performance control value PFC2_C.

When the global controller determines a first priority mode PRMD1 in which the SSD is the priority component and the FPGA is the non-priority component (S12: YES), the global controller may enable the first fixed performance controller FPC1 and the second variable performance controller VPC2, and disable the first variable performance controller VPC1 and the second fixed performance controller FPC2 (S15 and S16). Thus, the FPGA may operate with the variable performance based on the second variable performance control value PFC2(t) and the SSD may operate with the fixed performance based on the first fixed performance control value PFC1_C.

When the global controller determines a non-priority mode ATMD in which both of the SSD and the FPGA are the non-priority component (S12: NO), the global controller may enable the first variable performance controller VPC1 and the second variable performance controller VPC2 and disable the first fixed performance controller FPC1 and the second fixed performance controller FPC2 (S19 and S20). Thus, the SSD and the FPGA may operate with the variable performance based on the first and second variable performance control values PFC1(t) and PFC2(t), respectively. The global controller may wait for a predetermined time (S21) and then repeat the above described processes.

As will be described below with reference to FIG. 20, the global controller may generate an average power value APW indicating an average of the total power during a time window. When a difference APW–TPW between the average power value APW and the target power value TPW is smaller than a threshold value TH during the priority mode PRMD (S17: YES), the global controller may wait for a predetermined time (S18) and then repeat the above described processes. When the difference APW–TPW is not smaller than the threshold value TH (S17: NO), the global controller may convert the priority mode PRMD to the non-priority mode ATMD, that is, the global controller may perform the processes S19 and S20.

Figure 19:
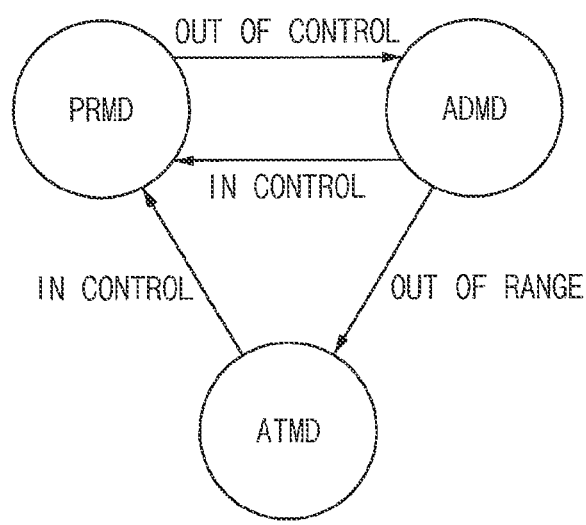
FIG. 19 is a conceptual diagram illustrating an example embodiment of an operation mode conversion in a storage device according to example embodiments.

FIG. 19 is a conceptual diagram illustrating an example embodiment of an operation mode conversion in a storage device according to example embodiments.

Referring to FIG. 19, the global controller may convert the operation mode of the storage device from the priority mode PRMD to an adaptive mode ADMD when it is determined that the power of the storage device is out of control during the priority mode PRMD. In contrast, the global controller may convert the operation mode of the storage device from the adaptive mode ADMD to the priority mode PRMD when it is determined that the power of the storage device is in control during the adaptive mode ADMD.

The global controller may convert the operation mode of the storage device from the adaptive mode ADMD to the non-priority mode ATMD when it is determined that the power of the storage device is out of range during the adaptive mode ADMD. The global controller may convert the operation mode of the storage device from the non-priority mode ATMD to the priority mode PRMD when it is determined that the power of the storage device is in control during the non-priority mode ATMD. FIGS. 20 and 21 illustrate a method based on the operation mode conversion of FIG. 19.

Figure 20:
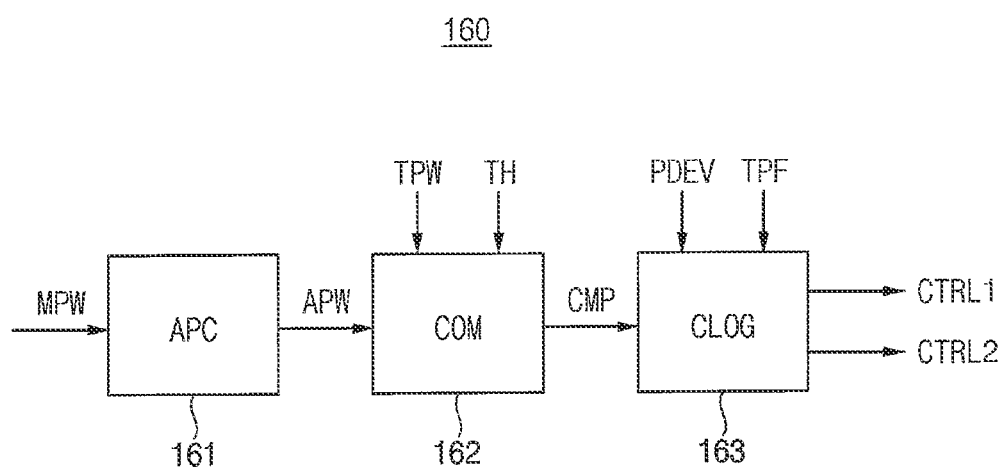
FIG. 20 is a block diagram illustrating an example embodiment of a global controller included in a storage device according to example embodiments.
Figure 21:
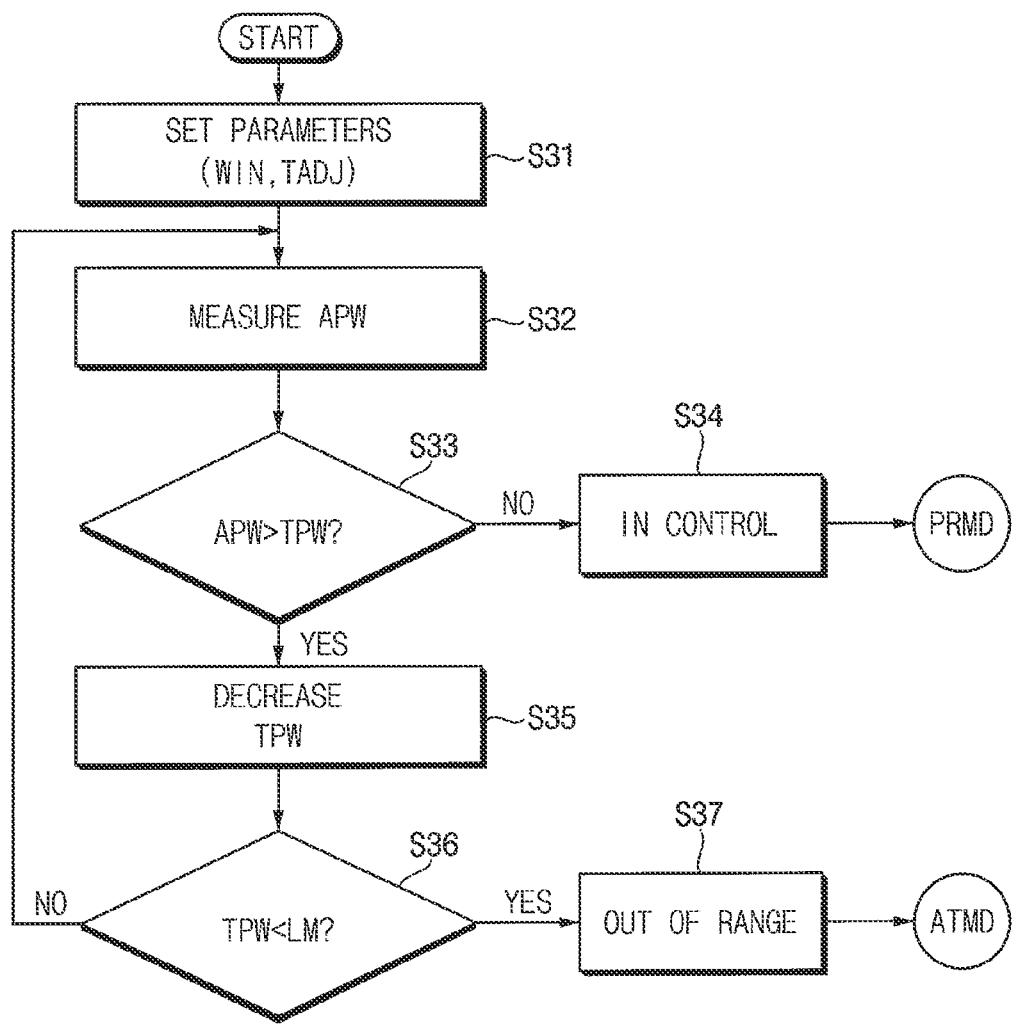
FIG. 21 is a flow chart illustrating a method of controlling an operation of a storage device according to example embodiments.

FIG. 20 is a block diagram illustrating an example embodiment of a global controller included in a storage device according to example embodiments, and FIG. 21 is a flow chart illustrating a method of controlling an operation of a storage device according to example embodiments.

Referring to FIG. 20, a global controller 160 may include an average power calculation unit APC 161, a comparator COM 162 and a control logic CLOG 163.

The average power calculation unit 161 may generate an average power value APW based on a measured power value MPW. The average power value APW may indicate an average of the total power of the storage device during a time window.

The comparator 162 may generate a comparison signal CMP based on the average power value APW, a target power value TPW and a threshold value TH such that the comparison signal CMP may indicate whether a difference APW-TPW between the average power value APW and the target power value TPW is smaller than the threshold value TH. The control logic 13 may generate the first control signal CTRL1 and the second control signal CTRL2 to control the SSD and the FPGA, respectively.

FIG. 21 illustrates a mode conversion method during the adaptive mode ADMD.

Referring to FIG. 21, the global controller may set parameters such as a time window WIN and a power control period TADJ (S31). The global controller may measure and generate the average power value APW (S32) by averaging the power of the storage device during the time window WIN as described with reference to FIG. 20.

When the average power value APW is greater than the target power value TPW (S33: YES), the global controller may decrease the target power value TPW (S35). When the average power value APW is not greater than the target power value TPW (S33: NO), the global controller may determine that the power of the storage device is in control (S34) and convert the operation mode from the adaptive mode ADMD to the priority mode PRMD.

When the target power value TPW is decreased to be lower than a low limit value LM (S36: YES), the global controller may determine that the power of the storage device is output of range (S37) and convert the operation mode from the adaptive mode ADMD to the non-priority mode ATMD.

The global controller may perform the processes of FIG. 21 periodically with the power adjustment period TADJ based on the average power value APW indicating the average of the total power during the time window WIN.

As a result, the global controller may sequentially decrease the target power value TPW with the power adjustment period TADJ when the total power exceeds the power limit in the adaptive mode ADMD and convert from the adaptive mode ADMD to the non-priority mode ATMD by determining both of the SSD and the FPGA as the non-priority component when the target power value TPW is decreased to be lower than the low limit value LM.

FIGS. 22A through 22D are timing diagrams illustrating example embodiments of setting a time window to measure an average power value of a storage device according to example embodiments. As described above with reference to FIGS. 20 and 21, the time window WIN is used to measure the average power value APW.

In FIGS. 22A through 22D, the horizontal axis indicates the time in units of a second and the vertical axis indicates an operation frequency Fo of the FPGA in units of MHz (megahertz), an input-output bandwidth IOB of the SSD in units of 10 MB/s (megabytes per second), and a target power value TPW and an average power value APW of the storage device in units of a W (Watt). "OOC" indicates an out-of-control state.

Figure 22A:
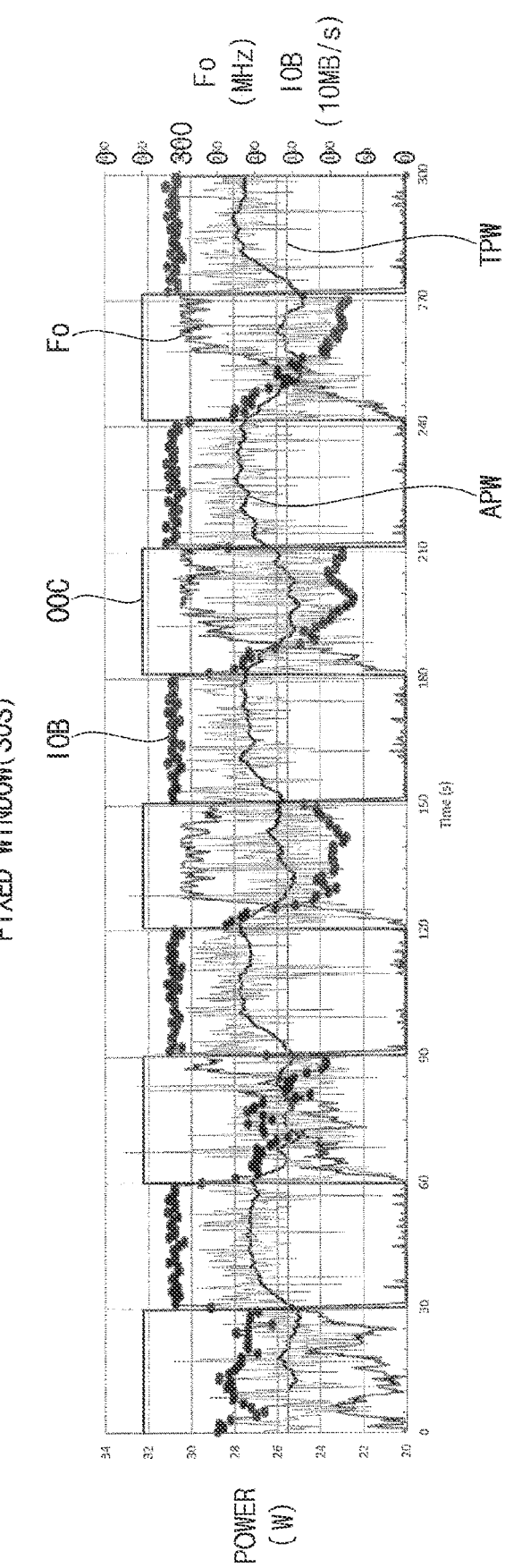
FIGS. 22A through 22D are timing diagrams illustrating example embodiments of setting a time window to measure an average power value of a storage device according to example embodiments.
Figure 22B:
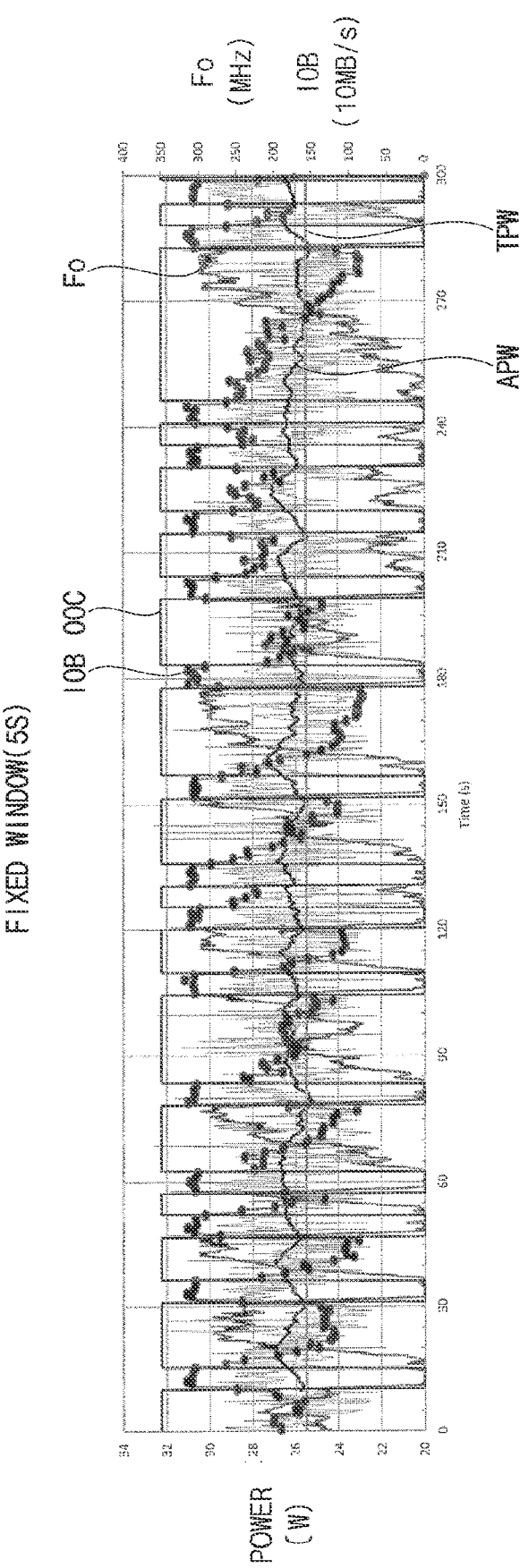

FIG. 22A illustrates a case of a fixed time window having a width of thirty seconds and FIG. 22B illustrates a case of a fixed time window having a width of five seconds. Referring to FIGS. 22A and 22B, in the case of the fixed time windows, the operation control may be relatively convenient but the average power value APW increases relatively. As the width of the fixed time window is decreased, the peak power may be reduced but the performance levels of the SSD and the FPGA may not be consistent.

Figure 22C:
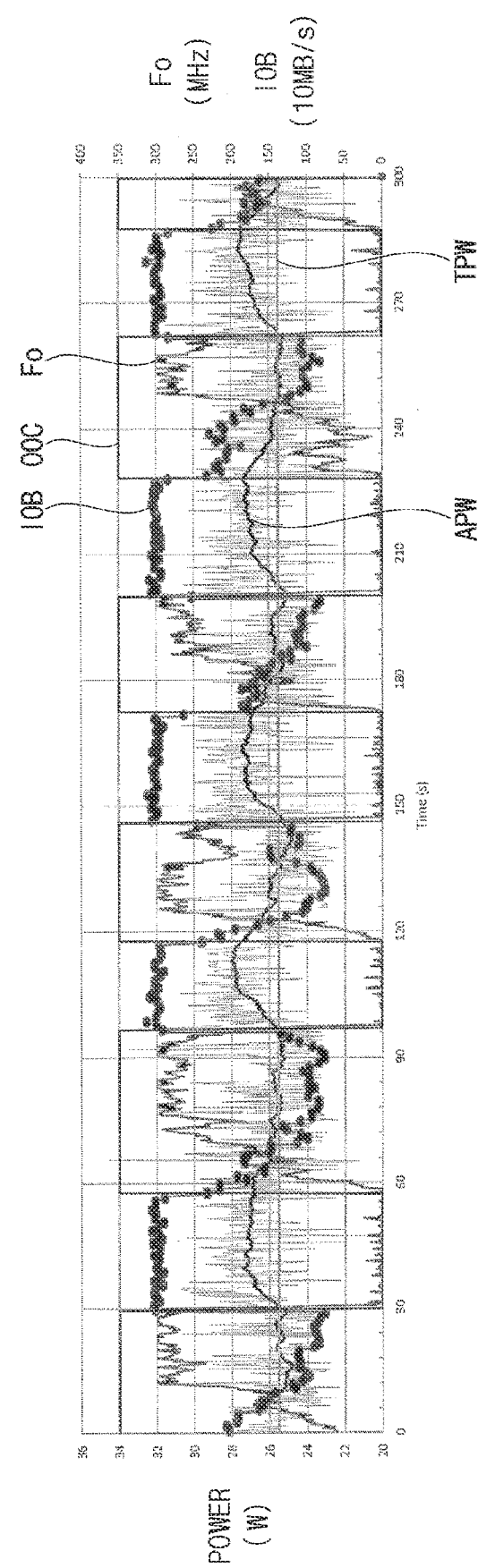
Figure 22D:
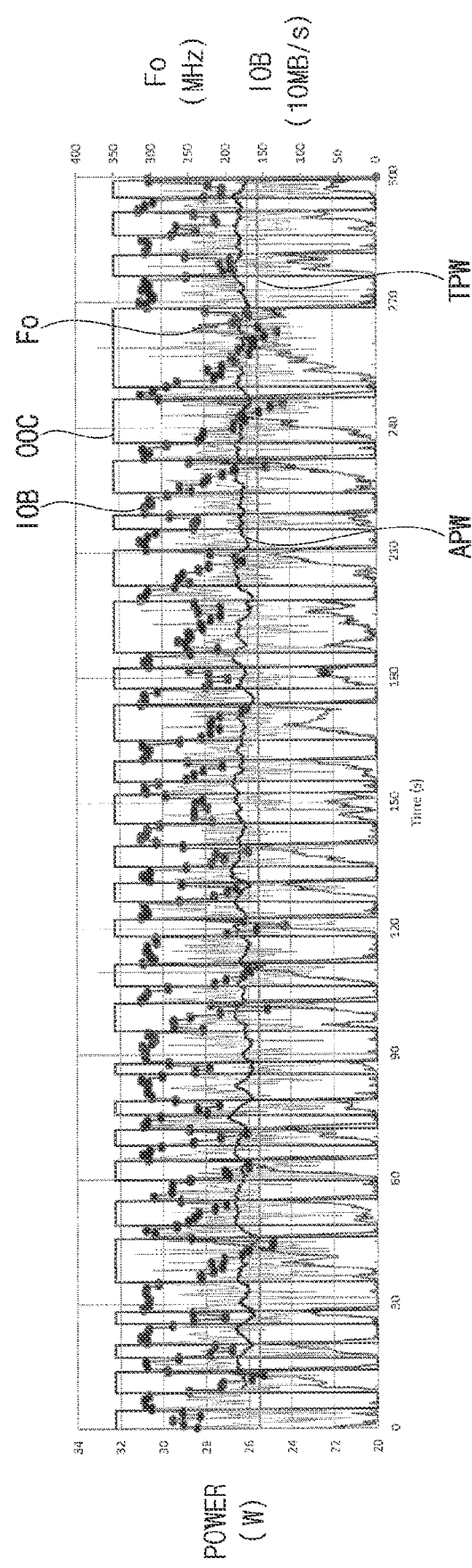

FIG. 22C illustrates a case of a moving time window having a width of thirty seconds and FIG. 22D illustrates a case of a moving time window having a width of five seconds. Referring to FIGS. 22C and 22D, in the case of the moving time windows, the peak power may be reduced in comparison with the peak power of the fixed time windows. As the width of the moving time window is decreased, the peak power may be reduced but the performance fluctuation may be increased.

The fixed time window or the moving time window with a proper width may be searched for, depending on the operation characteristics of the storage device, to optimize the performance and the stability of the storage device.

FIGS. 23A through 23E are timing diagrams illustrating results of a method of controlling an operation of a storage device according to example embodiments.

FIGS. 23A through 23E illustrate cases that the target performance value TPF is set to 20%, 40%, 60%, 80% and 80%, respectively, in the SSD priority mode.

Figure 23A:
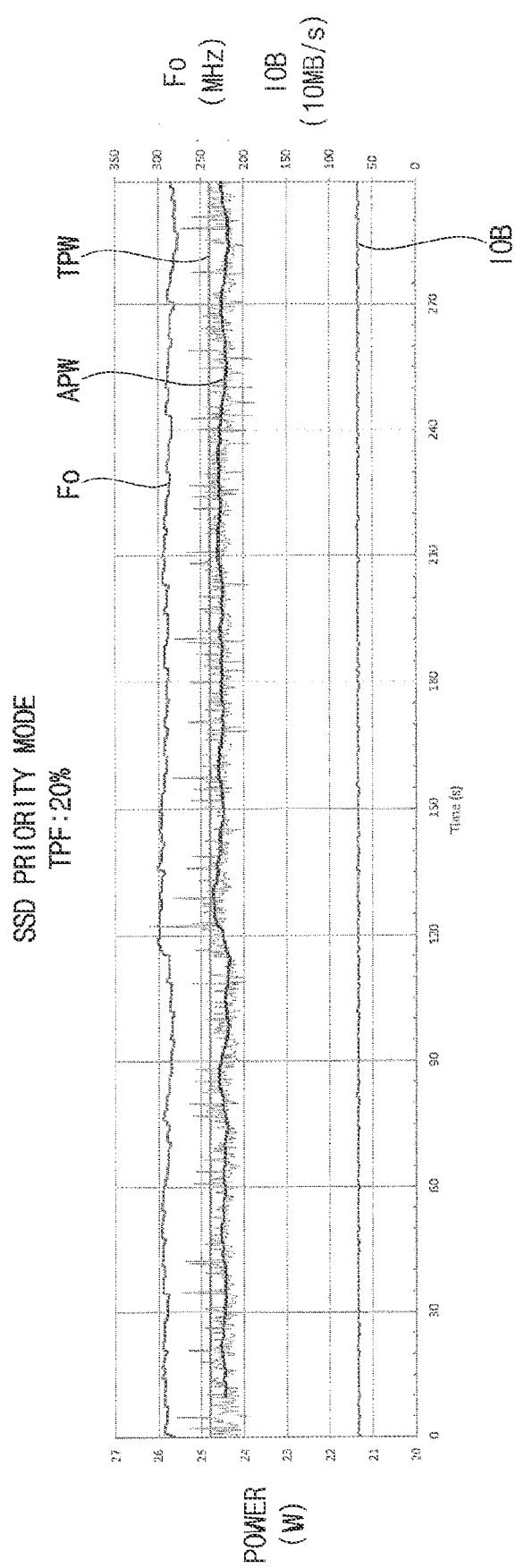
FIGS. 23A through 23E are timing diagrams illustrating results of a method of controlling an operation of a storage device according to example embodiments.
Figure 23B:
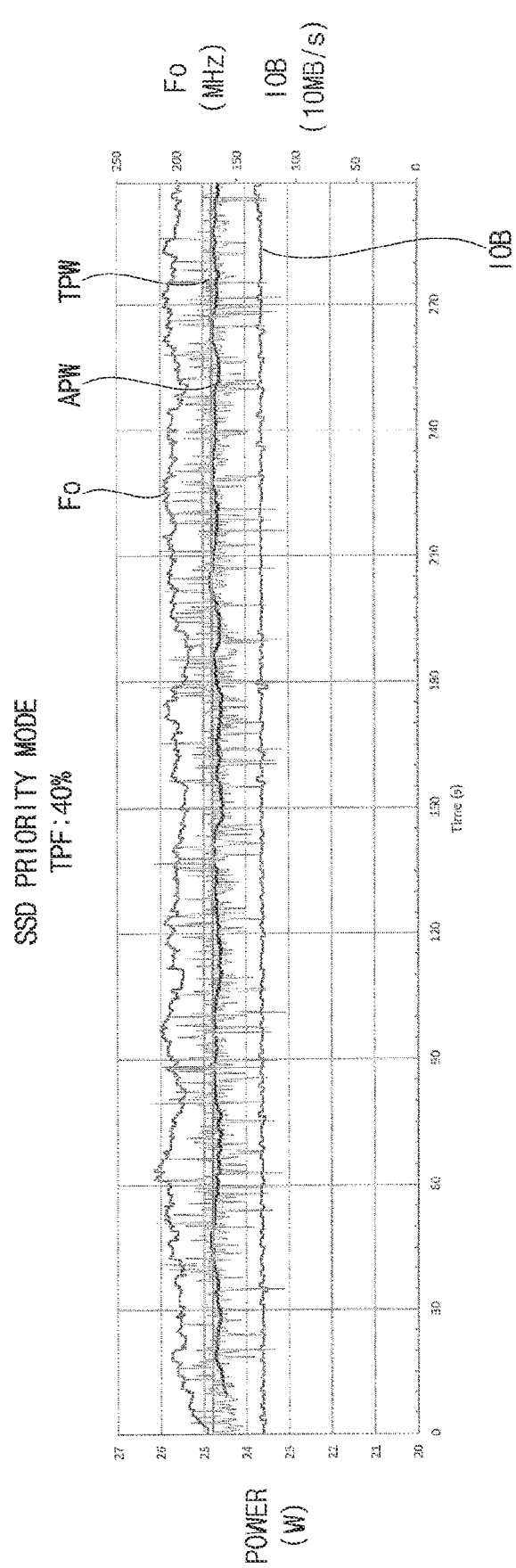
Figure 23C:
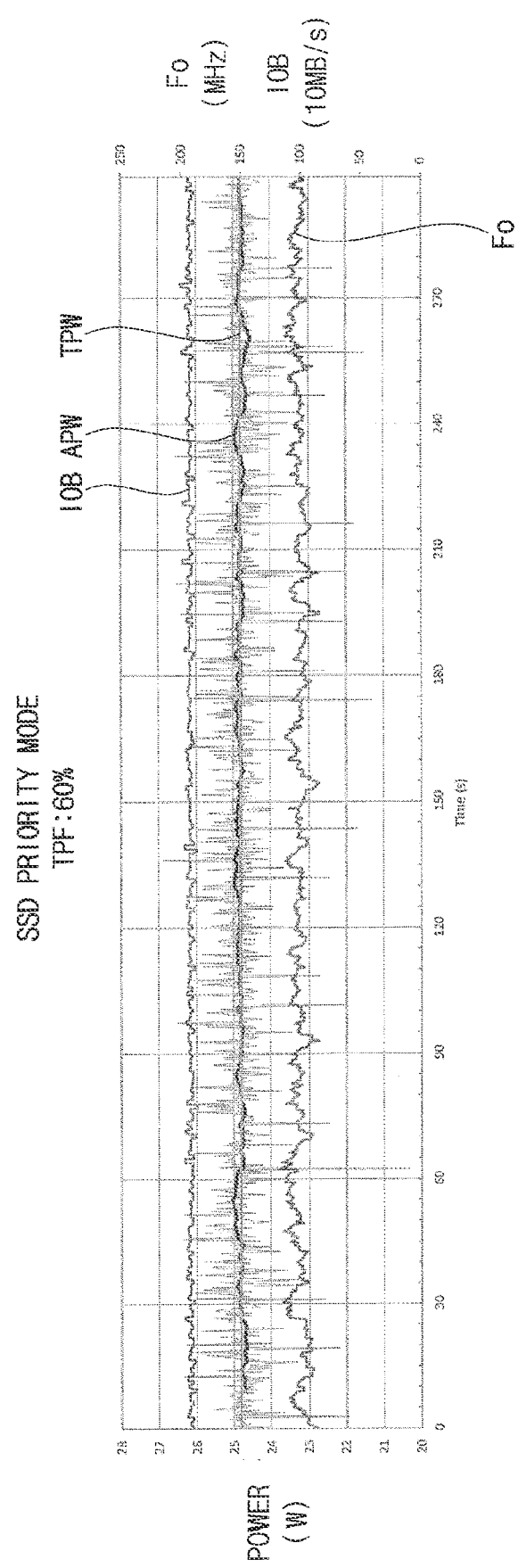

In the cases of FIGS. 23A, 23B and 23C, the input-output bandwidth IOB of the SSD may be maintained at 654.3 MB/s, 1268.8 MB/s, 1882.3 MB/s corresponding to the target performance value TPF of 20%, 40% and 60% and also the average power value APW may be maintained below the target power value TPW of 24.8 W. The operation frequency Fo of the FPGA is decreased as the target performance value TPF of the SSD is increased.

Figure 23D:
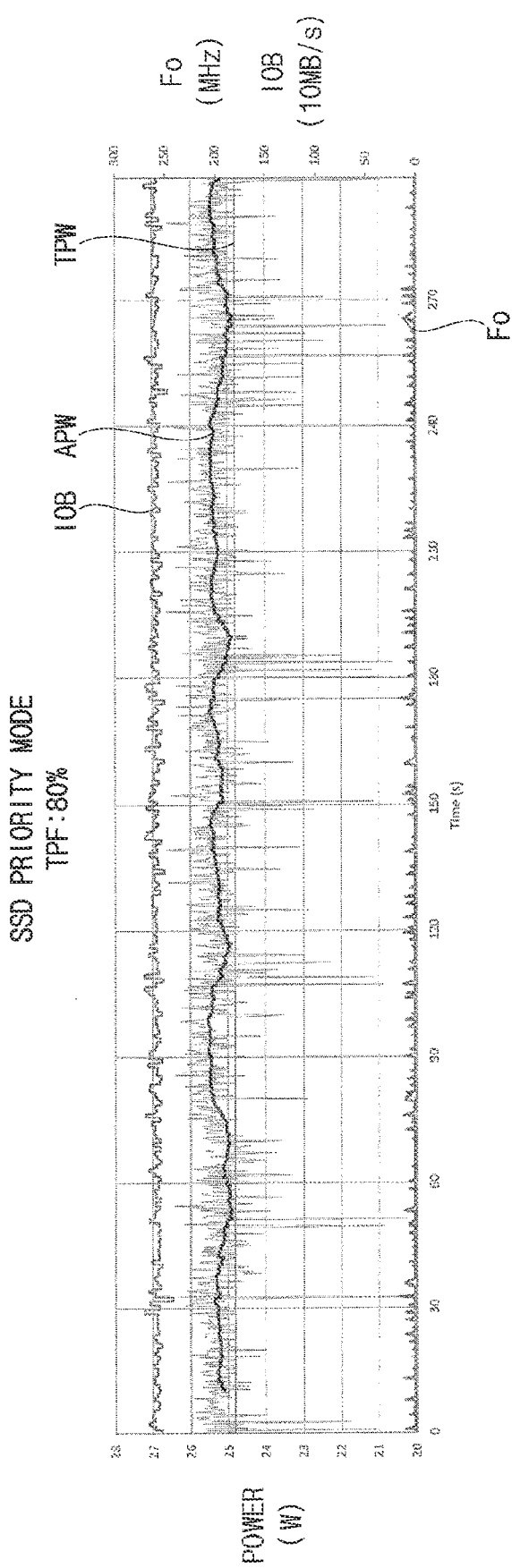
Figure 23E:
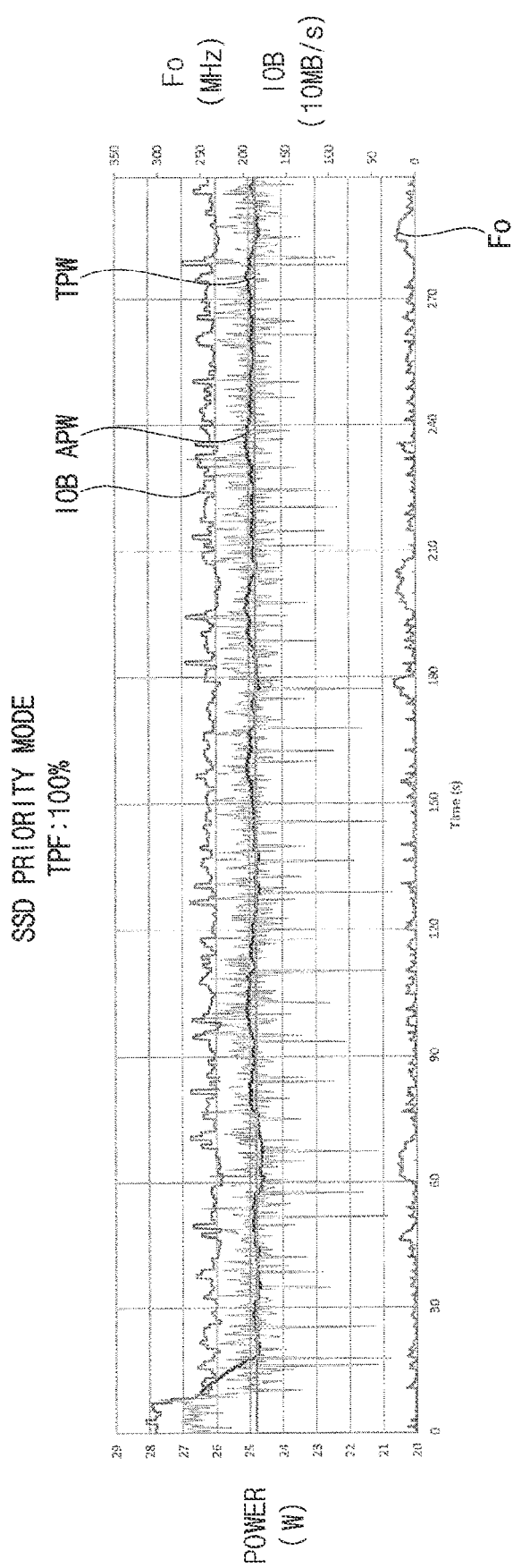

In the cases of FIGS. 23D and 23E, the operation frequency Fo of the FPGA may be maintained at a predetermined lowest level. In the case of FIG. 23D, the average power value APW slightly exceeds the target power value TPW because a threshold power value is set to be higher than the target power value TPW by about 1 W and the global controller does not determine the out-of-control state even though the average power value APW slightly exceeds the target power value TPW. In the case of FIG. 23E, in which the target performance value TPF is set to the maximum input-output bandwidth (for example, 3150 MB/s), the target performance value TPF is maintained during about the initial ten seconds and then reduced to about 2350 MB/s because the target performance value TPF of the SSD is too high even when the FPGA operates with the minimum performance.

As shown 23A through 23E, the performance balance between the SSD and the FPGA may be implemented efficiently and the power limit may be observed without prediction of respective powers of the SSD and the FPGA, through the priority mode according to example embodiments.

Figure 24:
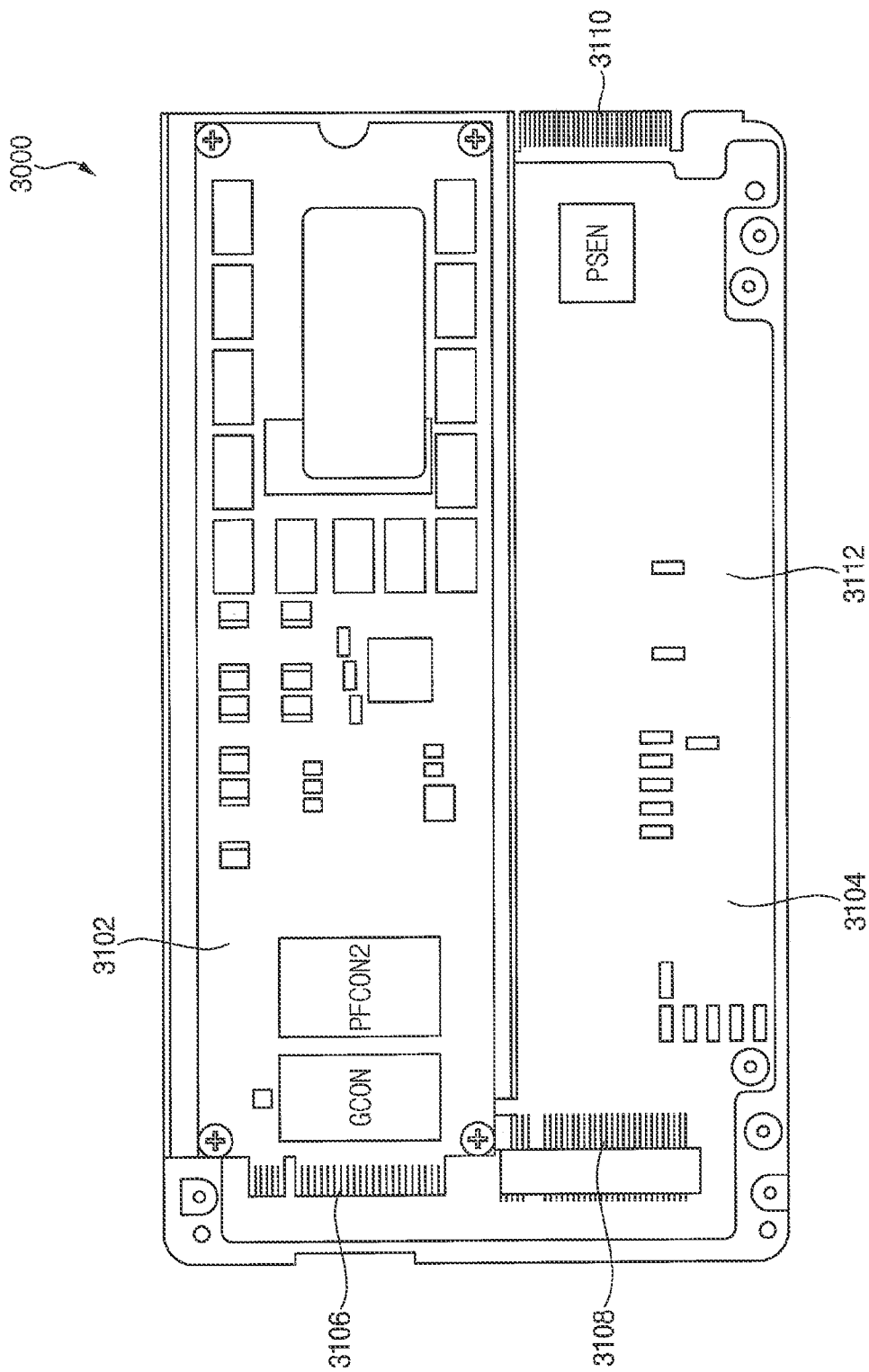
FIGS. 24 and 25 are plan and cross-sectional views illustrating a storage device according to example embodiments.
Figure 25:
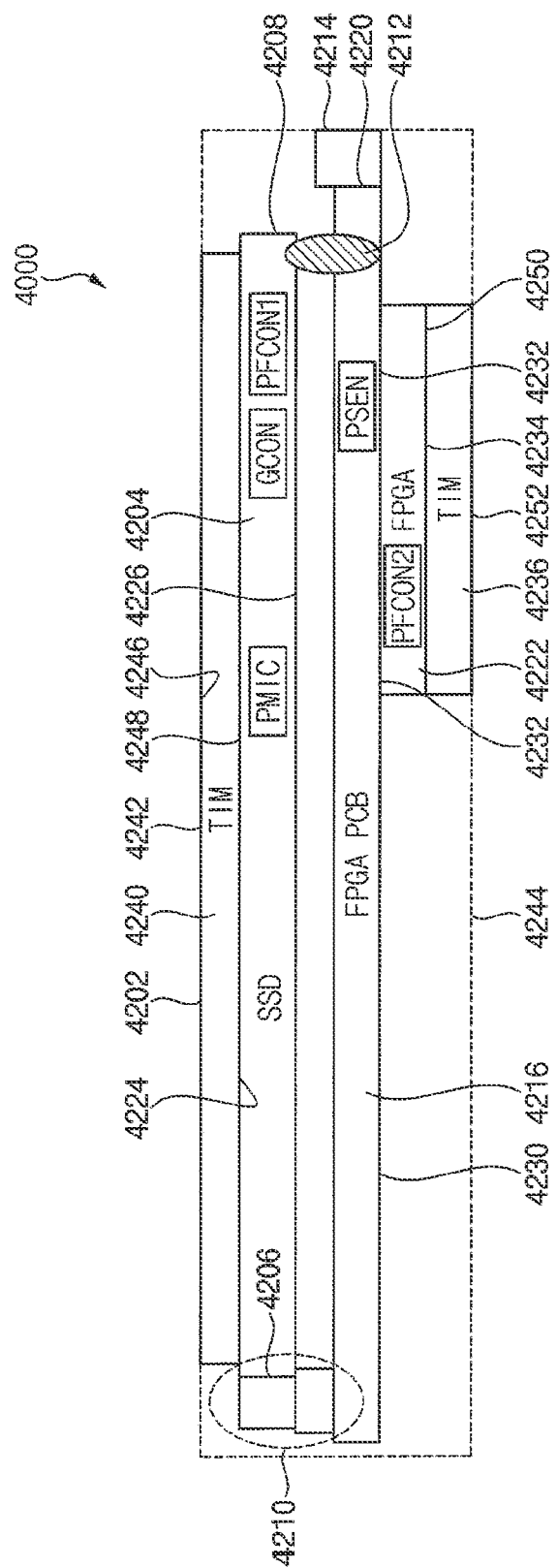

FIGS. 24 and 25 are plan and cross-sectional views illustrating a storage device according to example embodiments.

A storage device 3000 of FIG. 24 may include at least one SSD 3102, an FPGA printed circuit board (PCB) 3104, at least two standard SSD connectors such as M.2 3106 and 3108, and at least one U.2 connector 3110. The at least two M.2 connectors 3106 and 3108 may be vertical or 90 degree connectors to connect one or more SSDs (e.g., 3102) to the FPGA PCB 3104. The vertical M.2 connectors 3106 and 3108 are perpendicular with respect to a first side (e.g., a top side in FIG. 24) 3112 of the FPGA PCB 3104. The at least one SSD 3102 may be a 2.5-inch storage form factor, a new form factor 1 (NF1) SSD, etc. The at least one SSD 3102 is connected to the FPGA PCB 3104 at the first side 3112 of the FPGA PCB 3104 via the vertical M.2 connector 3106.

In some example embodiments, the storage device 300 may support, via the U.2 connector 3110, a plurality of SAS ports (e.g., SAS0 and SAS1) and up to four PCIe X4 lanes. The two SAS ports (SAS0 and SAS1) may be used as Ethernet ports by the storage device 3000.

In some example embodiments, an FPGA (shown, for example, in FIG. 25) may be connected to the FPGA PCB 3104 in a second side opposite to the first side 3112 of the FPGA PCB 3104 to which the at least one SSD 3102 is connected via the vertical M.2 connector 3106. In an example configuration, when the storage device 3000 is placed in a housing case, one or more layers of thermal interface material (TIM) may be placed between the housing case and the storage device 3000. In some example embodiments, the length of the FPGA PCB 3104 may be equal to or longer than a length of the at least one SSD 3102 and the FPGA.

FIG. 25 illustrates a cross-sectional view of a storage device 4000 in a housing case 4202. The storage device 4000 may be the storage device 3000 of FIG. 24. The storage device 4000 includes the housing case 4202, a first TIM layer 4240, at least one NF1 SSD 4204, at least one vertical M.2 connector 4210, a plastic or metal support or standoff 4212, an FPGA PCB 4216, an FPGA 4222, a second TIM layer 4236, and a standard SSD connector such as U.2 connector 4214.

In the example embodiment of FIG. 25, a first side 4246 of the first TIM layer 4240 is attached to (or in thermal contact with) a first side 4242 of the metal or thermal conductive housing case 4202. A second side 4248 of the first TIM layer 4240 is attached to (or in thermal contact with) a first side 4224 of the SSD 4204. The SSD 4204 is connected to the FPGA PCB 4216 via the vertical M.2 connector 4210, which is attached and electrically connected to the SSD 4204 at the second side 4206 of the SSD 4204. The vertical M.2 connector 4210 is mounted on the FPGA PCB 4216. In some example embodiments, the vertical M.2 connector 4210 and the FPGA PCB 4216 are separated by an air gap.

In some example embodiments, a plastic (or other suitable insulating material) support or standoff 4212, that provides structural support to the SSD 4204, may be located between a third side 4230 of the FPGA PCB 4216 and the third side 4226 of the SSD 4204. The plastic support or standoff 4212 may be located adjacent to the fourth side 4220 of the FPGA PCB 4216 and the fourth side 4208 of the SSD 4204.

In some example embodiments, the U.2 connector 4214 is mounted on and electrically connected to the FPGA PCB 4216. In an example configuration, the storage device 4000 may support, via the U.2 connector 4214, a plurality of SAS ports (e.g., SAS0 and SAS1) and up to four PCIe X4 lanes of a PCIe X4 bus. The two SAS ports (SAS0 and SAS1) may be used as Ethernet ports by the storage device 4000.

In the storage device 4000 of FIG. 25, the third side 4230 of the FPGA PCB 4216 is attached to a first side 4232 of the FPGA 4222. In some example embodiments, the FPGA 4222 may be mounted on the third side 4230 of the FPGA PCB 4216 and electrically connected to the FPGA PCB 4216. A second side 4234 of the FPGA 4222 is attached to (or in thermal contact with) the second TIM layer 4236 at a first side 4250 of the second TIM layer 4236. A second side 4252 of the second TIM layer 4236 is attached to (or in thermal contact with) the second side 4244 of the housing case 4202. The first TIM layer 4240 and the second TIM layer 4236 may be used to spread and dissipate the heat generated by the electronic devices such as the SSD 4204 and by the FPGA 4222 during the normal operation of the SSD 4204 and the FPGA 4222, to prevent overheating of the storage device 4000 by transferring the generated heat to outside of the storage device 4000 via the housing case 4202. In some example embodiments, the length of the second TIM layer 4236 may be equal to or longer than the length of the FPGA 4222.

The SSD 4204 may include a global controller GCON and a first performance controller PFCON1, and the FPGA 4222 may include a second performance controller PFCON2. A power sensor PSEN may be disposed at the FPGA PCB 4216. As described above, the global controller GCON may determine one of the SSD 4204 and the FPGA 4222 as the priority component operating with the fixed performance and the other of the SSD 4204 and the FPGA 4222 as the non-priority component operating with the variable performance in the priority mode based on the power control information provided from the host device. A PMIC may be disposed at the SSD 4204. The performance values generated from the first performance controller PFCON1 and the second performance controller PFCON2 may be provided to the PMIC.

Figure 26:
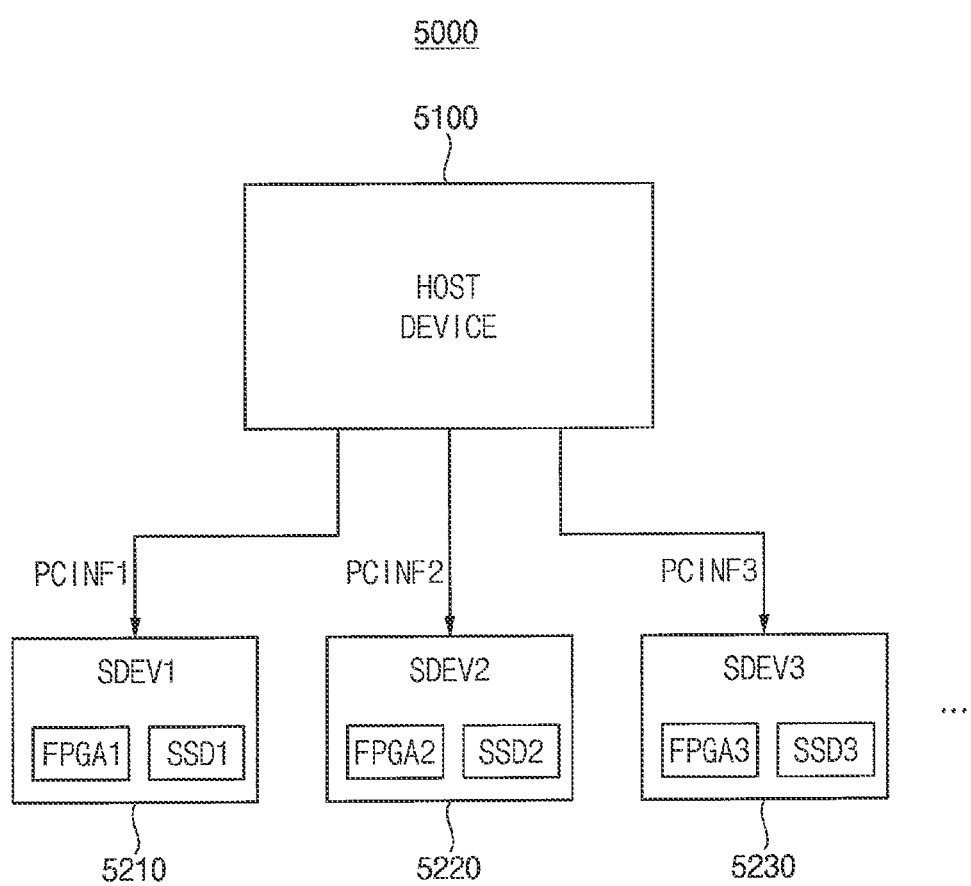
FIG. 26 is a block diagram illustrating a system including a storage device according to example embodiments.

FIG. 26 is a block diagram illustrating a system including a storage device according to example embodiments.

Referring to FIG. 26, a computing system 5000 may include a host device 5100 and a plurality of storage devices 5210, 5220 and 5230.

The storage devices 5210, 5220 and 5230 may include field programmable gate arrays FPGA1, FPGA2 and FPGA3 and solid state drives SSD1, SSD2 and SSD3, respectively.

According to example embodiments, the storage devices 5210, 5220 and 5230 may receive power control information PCINF1, PCINF2 and PCINF3, respectively, from the host device 5100 and may control each of the storage devices 5210, 5220 and 5230 to operate in the priority mode based on the power control information PCINF1, PCINF2 and PCINF3 as described above.

The host device 5100 may perform power control of the storage devices 5210, 5220 and 5230 according to a scheduling scenario based on workloads of the storage devices 5210, 5220 and 5230. In some example embodiments, the power control of the host device 5100 may be performed by configuring a mapping table indicating relationships between the workloads and the parameters of the priority mode. In some example embodiments, the power control of the host device 5100 may be performed based on model-based software if the workloads may be modeled appropriately.

As described above, the multi-component device such as the storage device and the method of controlling the operation of the multi-component device according to example embodiments may efficiently implement performance balance and observe the power limit without prediction of powers of the respective components, through the priority mode in which at least one component is controlled to operate as the priority component having the fixed performance and the other components are controlled to operate as the non-priority component having the variable performance.

As will be appreciated by one skilled in the art, example embodiments may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

The disclosure may be applied to any electronic devices and systems. For example, the disclosure may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The foregoing is illustrative of example embodiments and is not to be construed as limiting thereof. Although a few example embodiments have been described, those skilled in the art will readily appreciate that many modifications are possible in the example embodiments without materially departing from the present disclosure.

What is claimed is:

1. A storage device comprising:
   a solid state drive (SSD) configured to store data and receive power through a power rail connected to a host device;
   a field programmable gate array (FPGA) configured to process data read from the SSD or data to be stored in the SSD and receive power through the power rail;
   a power sensor connected to the power rail and configured to generate a measured power value corresponding to a total power consumed by the SSD and the FPGA by measuring the total power; and a global controller configured to determine one of the SSD and the FPGA as a priority component operating with a fixed performance and determine another of the SSD and the FPGA as a non-priority component operating with a variable performance in a priority mode based on power control information provided from the host device.

2. The storage device of claim 1, wherein the power control information provided from the host device includes a target power value indicating a power limit of the storage device, priority component information indicating the priority component and a target performance value indicating the fixed performance of the priority component.

3. The storage device of claim 2, wherein the priority component operates with the fixed performance in the priority mode based on the target performance value regardless of the measured power value.

4. The storage device of claim 3, wherein the non-priority component operates with the variable performance in the priority mode based on the target power value and the measured power value such that the total power does not exceed the power limit.

5. The storage device of claim 2, wherein:
the global controller determines each of the SSD and the FPGA as the non-priority component in a non-priority mode, and
each of the SSD and FPGA operates with the variable performance in the non-priority mode based on the target power value and the measured power value such that the total power does not exceed the power limit.

6. The storage device of claim 5, wherein the global controller monitors whether the total power exceeds the power limit based on the target power value and the measured power value, and when the total power exceeds the power limit in the priority mode, the global controller converts from the priority mode to an adaptive mode in which the target power value is changed.

7. The storage device of claim 6, wherein the global controller adjusts the target power value periodically with a power adjustment period based on an average power value indicating an average of the total power during a time window.

8. The storage device of claim 7, wherein:
the global controller sequentially decreases the target power value with the power adjustment period when the total power exceeds the power limit in the adaptive mode and converts from the adaptive mode to the non-priority mode by determining each of the SSD and the FPGA as the non-priority component when the target power value is decreased to be lower than a low limit value, and
each of the SSD and FPGA operates with the variable performance in the non-priority mode based on the target power value and the measured power value such that the total power does not exceed the power limit.

9. The storage device of claim 2, wherein:
the SSD includes:
a first fixed performance controller configured to, based on the target performance value, generate a first fixed performance control value to control the fixed performance of the SSD; and
a first variable performance controller configured to, based on the target power value and the measured power value, generate a first variable performance control value to control the variable performance of the SSD such that the total power does not exceed the power limit, and
the FPGA includes:
a second fixed performance controller configured to, based on the target performance value, generate a second fixed performance control value to control the fixed performance of the FPGA; and
a second variable performance controller configured to, based on the target power value and the measured power value, generate a second variable performance control value to control the variable performance of the FPGA such that the total power does not exceed the power limit.

10. The storage device of claim 9, wherein each of the first variable performance controller and the second variable performance controller includes a proportional-integral-differential (PID) controller configured to generate each of the first variable performance control value and the second variable performance control value based on the target power value and the measured power value such that the measured power value converges to the target power value.

11. The storage device of claim 9, wherein the first fixed performance control value and the first variable performance control value indicate an input-output bandwidth of the SSD and the second fixed performance control value and the second variable performance control value indicate an operation frequency of the FPGA.

12. The storage device of claim 9, wherein in a first priority mode in which the SSD is determined as the priority component and the FPGA is determined as the non-priority component, the global controller enables the first fixed performance controller and the second variable performance controller and disables the second fixed performance controller and the first variable performance controller such that the SSD operates with the fixed performance based on the first fixed performance control value and the FPGA operates with the variable performance based on the second variable performance control value.

13. The storage device of claim 9, wherein in a second priority mode in which the FPGA is determined as the priority component and the SSD is determined as the non-priority component, the global controller enables the first variable performance controller and the second fixed performance controller and disables the first fixed performance controller and the second variable performance controller such that the SSD operates with the variable performance based on the first variable performance control value and the FPGA operates with the fixed performance based on the second fixed performance control value.

14. The storage device of claim 9, wherein in a non-priority mode in which each of the SSD and the FPGA are determined as the non-priority component, the global controller enables the first variable performance controller and the second variable performance controller and disables the first fixed performance controller and the second fixed performance controller such that the SSD operates with the variable performance based on the first variable performance control value and the FPGA operates with the variable performance based on the second variable performance control value.

15. The storage device of claim 2, wherein the global controller receives a ratio of the fixed performance with respect to a maximum performance of the priority component as the target performance value from the host device.

16. The storage device of claim 2, wherein:
- each of the SSD and the FPGA includes a temperature sensor configured to generate an operation temperature value indicating an operation temperature of each of the SSD and the FPGA by measuring the operation temperature, and
- the non-priority component operates with the variable performance based on the target power value, the measured power value, the operation temperature value, and a target temperature value indicating a limit of the operation temperature.

17. The storage device of claim 2, wherein the power control information is provided based on a command that is transferred from the host device to the SSD.

18. A multi-component device comprising:
- a plurality of components configured to receive power through a power rail connected to a host device;
- a power sensor connected to the power rail and configured to generate a measured power value corresponding to a total power consumed by the plurality of components by measuring the total power; and
- a global controller configured to determine one of the plurality of components as a priority component operating with a fixed performance and determine the components except the priority component as non-priority components operating with a variable performance in a priority mode based on power control information provided from the host device.

19. The multi-component device of claim 18, wherein:
- the global controller monitors whether the total power exceeds a power limit based on a target power value and the measured power value and when the total power exceeds the power limit in the priority mode, the global controller converts from the priority mode to a non-priority mode by determining all of the plurality of components as the non-priority components, and
- each of the plurality of components operates with the variable performance in the non-priority mode based on the target power value and the measured power value such that the total power does not exceed the power limit.

20. A method of controlling an operation of a multi-component device including a plurality of components, the method comprising:
- providing power to the plurality of components through a power rail connected to a host device;
- generating a measured power value indicating a total power consumed by the plurality of components by measuring the total power using a power sensor connected to the power rail; and
- determining at least one of the plurality of components as a priority component operating with a fixed performance and determining the components except the priority component as non-priority components operating with a variable performance in a priority mode based on power control information provided from the host device.

* * * * *